United States Patent
Yagyu et al.

(10) Patent No.: US 6,338,021 B1
(45) Date of Patent: Jan. 8, 2002

(54) ROUTE SELECTION METHOD AND SYSTEM

(75) Inventors: Takeshi Yagyu, Osaka; Makoto Fushimi, Hirakata; Yoshiki Ueyama, Sakai, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/671,109

(22) Filed: Sep. 28, 2000

(30) Foreign Application Priority Data

Sep. 29, 1999 (JP) ............................................. 11-276553

(51) Int. Cl.[7] ............................. H04B 7/185; G01S 5/02
(52) U.S. Cl. ........................ 701/209; 340/990; 340/995; 701/211
(58) Field of Search ................................ 701/209, 200, 701/208, 211, 213; 340/990, 995

(56) References Cited

U.S. PATENT DOCUMENTS 6,084,543 A * 7/2000 Iizuka ..................... 342/357.13
6,173,232 B1 * 1/2001 Nanba et al. ................ 701/209

FOREIGN PATENT DOCUMENTS

| JP | 59-105113 | 6/1984 |
| JP | 4-204881 | 7/1992 |
| JP | 4-372985 | 12/1992 |

OTHER PUBLICATIONS

"GDF, a Proposed Standard for Digital Road Maps to be Used in Car Navigation Systems", 1989 IEEE, H. Claussen et al., pp. 324–331.

* cited by examiner

Primary Examiner—William A. Cuchlinski, Jr.
Assistant Examiner—Olga Hernandez
(74) Attorney, Agent, or Firm—Wenderoth, Lind & Ponack, L.L.P.

(57) ABSTRACT

In a route selection process, an optimal route searcher 5 refers to a traffic light flag included in route selecting data stored in a second storage 4 to see whether a target intersection has any traffic light or not. When the optimal route searcher 5 determines that the target intersection has a traffic light s, a traffic light cost calculator 6 calculates a traffic light cost relevant to a waiting time due to the traffic light s. Based on the traffic light cost thus calculated by the traffic light cost calculator 6, the optimal route searcher 5 calculates a passage cost relevant to a time taken for passing the target intersection. In this manner, with consideration for the waiting time due to the traffic light, a time for going through an entire route can be estimated with higher correctness, thereby rendering the route thus searched more optimal.

32 Claims, 18 Drawing Sheets

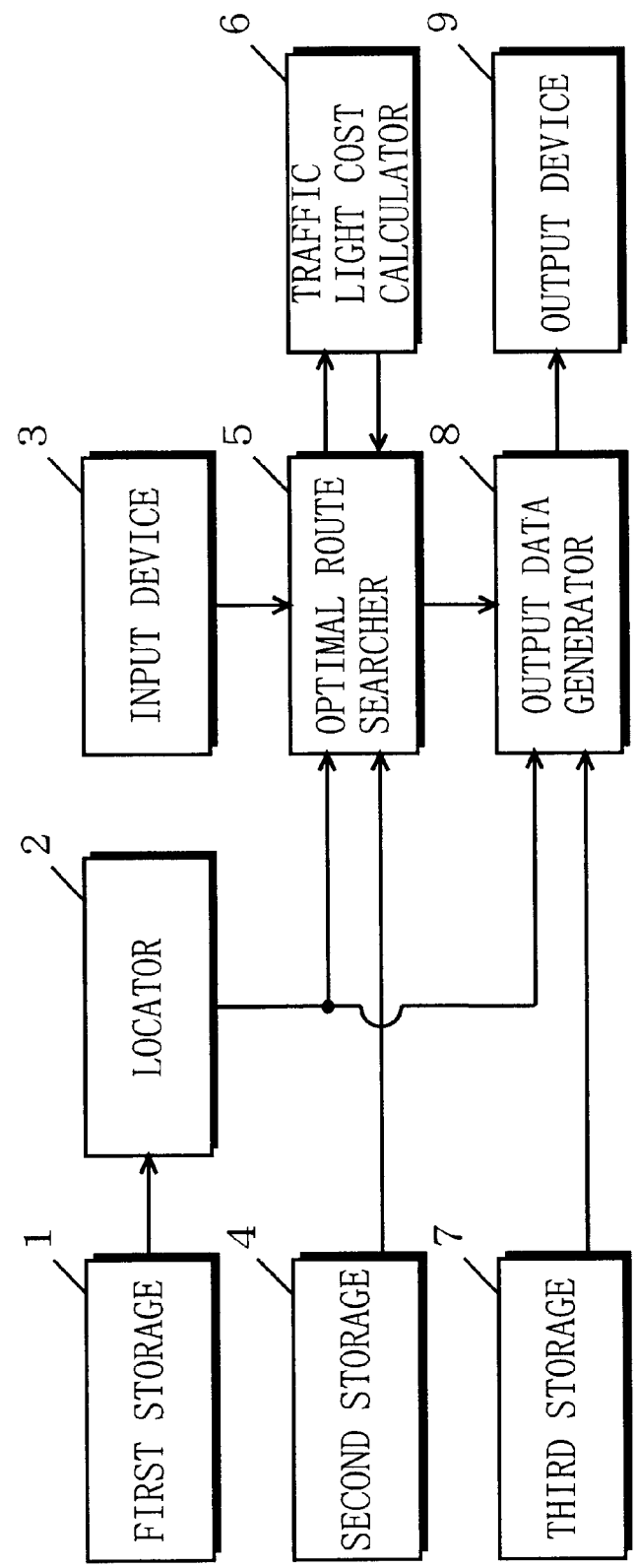

FIG. 2A
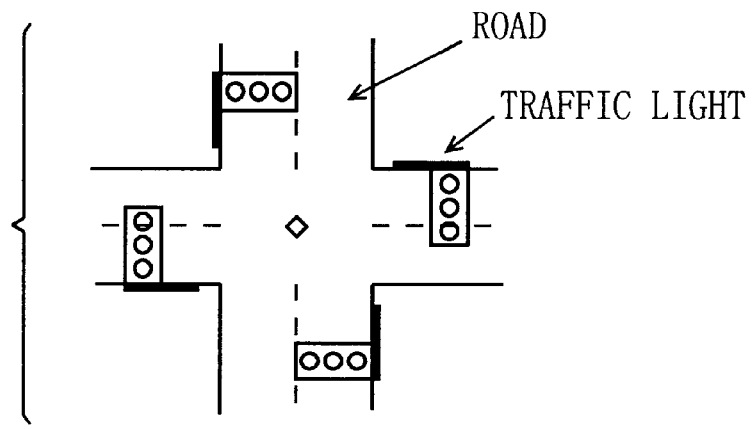
FIG. 2B
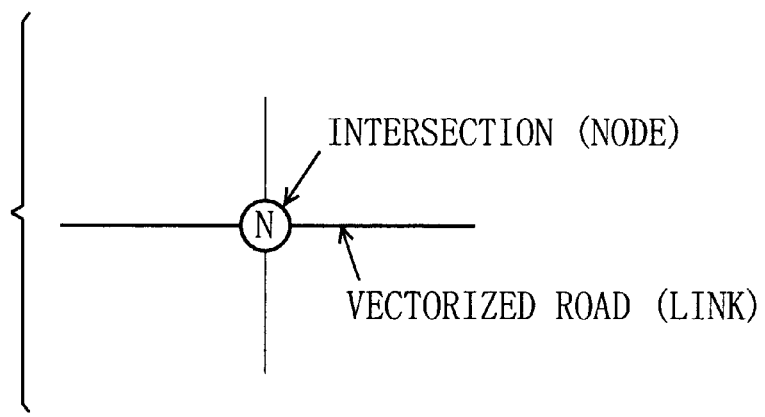
FIG. 2C
NODE TABLE
| NODE IDENTIFIER | TRAFFIC LIGHT FLAG |
|---|---|
| 1 | ABSENT |
| ⋮ | ⋮ |
| N | PRESENT |
| N+1 | PRESENT |
| ⋮ | ⋮ |

FIG. 3A
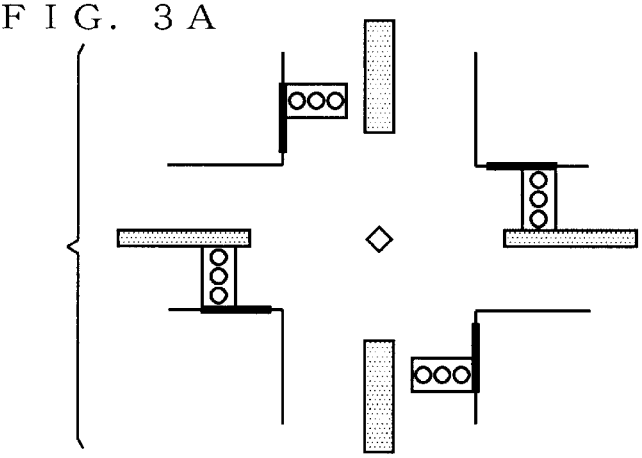
FIG. 3B
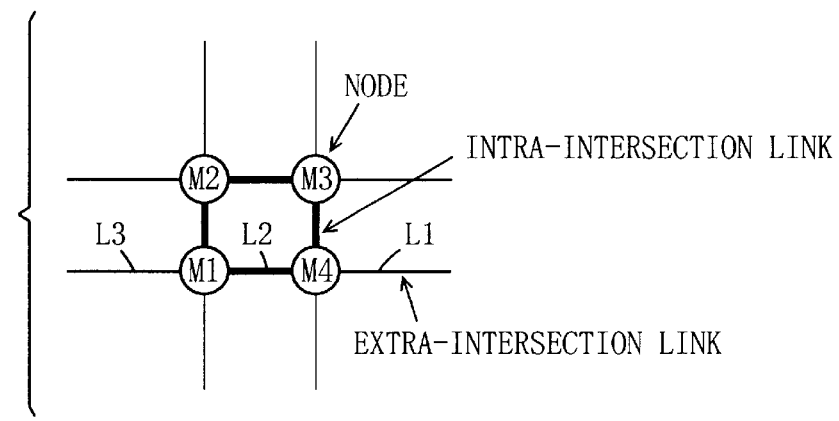
FIG. 3C
NODE TABLE
| NODE IDENTIFIER | TRAFFIC LIGHT FLAG |
|---|---|
| 1 | ABSENT |
| ⋮ | ⋮ |
| M1 | PRESENT |
| M2 | PRESENT |
| ⋮ | ⋮ |
LINK TABLE
| LINK IDENTIFIER | INTERSECTION FLAG |
|---|---|
| 1 | EXTERNAL |
| ⋮ | ⋮ |
| L1 | EXTERNAL |
| L2 | INTERNAL |
| L3 | EXTERNAL |
| ⋮ | ⋮ |

NODE TABLE

| NODE IDENTIFIER | TRAFFIC LIGHT FLAG | WAITING TIME RATIO |
|---|---|---|
| : | : | : |
| N | PRESENT | L1, L2=70% |
| : | : | : |
| M | ABSENT | — |
| : | : | : |

LINK TABLE

| LINK IDENTIFIER | INTERSECTION FLAG |
|---|---|
| : | : |
| L1 | EXTERNAL |
| L2 | EXTERNAL |
| L3 | EXTERNAL |
| : | : |
| R1 | EXTERNAL |
| R2 | EXTERNAL |
| : | : |

| REFERENCE WAITING TIME COST | S |
|---|---|

R/S=WAITING TIME RATIO(=0.7)
ΔR=1−WAITING TIME RATIO

NODE TABLE

| NODE IDENTIFIER | TRAFFIC LIGHT FLAG | WAITING TIME RATIO |
|---|---|---|
| ⋮ | ⋮ | ⋮ |
| N1 | PRESENT | L5, L6=80% |
| N2 | PRESENT | L1, L2=80% |
| N3 | PRESENT | L2, L3=80% |
| N4 | PRESENT | L4, L5=80% |
| ⋮ | ⋮ | ⋮ |

LINK TABLE

| LINK IDENTIFIER | INTERSECTION FLAG |
|---|---|
| ⋮ | ⋮ |
| L1 | EXTERNAL |
| L2 | INTERNAL |
| L3 | EXTERNAL |
| L4 | EXTERNAL |
| L5 | INTERNAL |
| L6 | EXTERNAL |
| ⋮ | ⋮ |
| R1 | EXTERNAL |
| R2 | INTERNAL |
| R3 | EXTERNAL |
| R4 | EXTERNAL |
| R5 | INTERNAL |
| R6 | EXTERNAL |
| ⋮ | ⋮ |

TRAFFIC LIGHT
COST CALCULATED

NO TRAFFIC LIGHT COST

NO TRAFFIC LIGHT COST

NODE TABLE

| NODE IDENTIFIER | TRAFFIC LIGHT FLAG | WAITING TIME RATIO |
|---|---|---|
| ⋮ | ⋮ | ⋮ |
| N1 | PRESENT | L1, L2=70% |
| N2 | PRESENT | L2, L3=70% |
| N3 | PRESENT | L3, L4=70% |
| N4 | PRESENT | L4, L5=70% |
| N5 | PRESENT | L5, L6=70% |
| N6 | PRESENT | L6, L7=70% |
| ⋮ | ⋮ | ⋮ |
| M1 | PRESENT | R1, R2=100% |
| ⋮ | ⋮ | ⋮ |

LINKAGE TABLE

| LINKAGE NUMBER | TIME RANGE | SET OF NODE IDENTIFIERS |
|---|---|---|
| 1 | 0:00〜4:59 | N1, M1 |
| 2 | 5:00〜22:59 | N1, N2, N3, N4, N5, N6 |
| 3 | 23:00〜23:59 | N1, M1 |
| 4 | 5:00〜22:59 | M1... |
| ⋮ | ⋮ | ⋮ |

F I G. 1 2
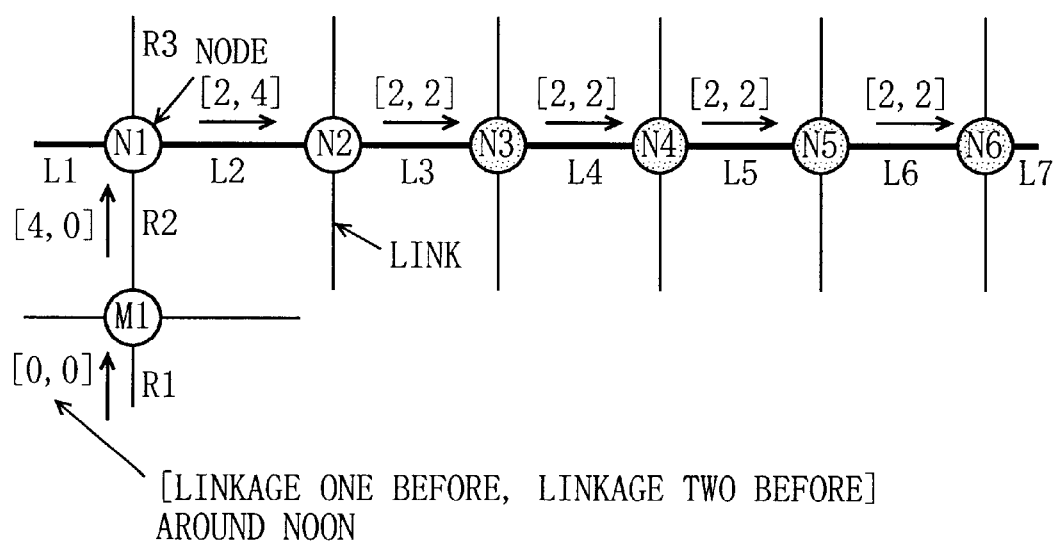

ROUTE SELECTION METHOD AND SYSTEM

BACKGROUND OF THE INVENTION

1. Field of the Invention

The present invention relates to route selection systems and, more specifically, to a system for automatically selecting an optimal route between a starting point and a destination designated on a map.

2. Description of the Background Art

Recently, with the progression of electronic technology, car navigation systems became popular with great speed. Some conventional car navigation systems are equipped with a route selection system so that an optimal route (e.g., shortest, fastest) between a starting point and a destination is automatically selected.

Applied in such conventional route selection system is exemplarily a method disclosed in Japanese Patent Laid-Open Publication No. 59-105113 (84-105113). This method makes use of Dijkstra method, for example, to determine an optimal route between a starting point and a destination utilizing data representing road connection. The theory of the Dijkstra method is found in "Data Structures and Algorithms", written by A. V. Aho, et al., and translated by Yoshio Ono, Baifu-kan, 1990, pp. 179–183.

Another method for determining an optimal route is exemplarily a route search method disclosed in Japanese Patent Laid-Open Publication No. 4-204881 (92-204881). In this method, the route search is simultaneously made in a bi-directional manner, both a search from a starting point and a search from a destination. With such bi-directional search, searching time is shortened.

Still another method for determining an optimal route is disclosed in Japanese Patent Laid-Open Publication No. 4-372985 (92-372985) titled "Recommended Route Guiding Device", for example. The method is for calculating cost of right-turns and left-turns at intersections and adding the calculated cost to an evaluation value for an optimal route.

In such conventional methods, however, no consideration is given for stops at traffic lights and consequences to be caused thereby, including delay in a vehicle's reaching its destination due to acceleration and deceleration before and after the stops. Therefore, any optimal route determined by such conventional methods cannot bring the vehicle to its destination within the estimated time.

SUMMARY OF THE INVENTION

Therefore, an object of the present invention is to provide a route selection method and system for searching for an optimal route while taking stops at traffic lights on the way into consideration.

In order to attain the object above, a first aspect of the present invention is directed to a route selection method for selecting an optimal route on a map, road network data representing an intersection and a road, and route selecting data including a traffic light flag to indicate whether the intersection has a traffic light or not are previously stored, the method comprising: a first step of determining, during a route search process for selecting an optimal route between a designated starting point and a destination, whether a target intersection has a traffic light by referring to the traffic light flag included in the route selecting data; and a second step of calculating, based on the determination made in the first step, a passage cost for passing the target intersection, wherein the passage cost calculated in the second step is based on to select the optimal route.

In the first aspect, the route selecting data including the traffic light flag which indicates presence or absence of traffic light at intersections is previously stored. In the second step, during the route search process based on the route selecting data, the passage cost is calculated depending on whether the target intersection has any traffic light. In this manner, the passage cost calculated in the second step can accordingly vary. Therefore, it becomes possible to find an optimal route under careful consideration for stops at traffic lights and consequences to be caused thereby, including delay in a vehicle's reaching its destination due to acceleration and deceleration before and after the stops, for example According to a second aspect, in the first aspect, in the second step, when the target intersection is determined as having the traffic light in the first step, a traffic light cost relevant to a waiting time due to the traffic light is calculated, and based on the calculated traffic light cost, the passage cost is calculated for the target intersection.

In the second aspect, the traffic light cost is calculated only when the target intersection has any traffic light. In this manner, in the route search process, it becomes possible to find an optimal route under careful consideration for a waiting time due to traffic lights and consequences to be caused thereby.

According to a third aspect, in the first aspect, the route selecting data further includes road type information for specifying a road by type, and in the second step, when the target intersection is determined as having the traffic light in the first step, the road type information for a road connected to the target intersection is referred to for calculating the traffic light cost relevant to the waiting time due to the traffic light, and based on the calculated traffic light cost, the passage cost is calculated for the target intersection.

In the third aspect, the traffic light cost is calculated based on a road type of roads connected to the intersection. In this manner, the traffic light cost thus calculated can vary depending on whether the road leading to the intersection has a higher priority over the others. Therefore, in the route search process, it becomes possible to find an optimal route in a manner reflecting any influence caused by a waiting time at intersections, for example.

According to a fourth aspect, in the first aspect, the route selection data further includes road width information for specifying a road by width, in the second step, when the target intersection is determined as having the traffic light in the first step, the road width information for a road connected to the target intersection is referred to for calculating the traffic light cost relevant to the waiting time due to the traffic light, and based on the calculated traffic light cost, the passage cost is calculated for the target intersection.

According to a fifth aspect, in the first aspect, the route selection data further includes lane information for specifying a road by the number of lanes, in the second step, when the target intersection is determined as having the traffic light in the first step, the lane information for a road connected to the target intersection is referred to for calculating the traffic light cost relevant to the waiting time due to the traffic light, and based on the calculated traffic light cost, the passage cost is calculated for the target intersection.

In the fourth and fifth aspects, the traffic light cost is calculated by referring to the width or the number of lanes of a road connected to an intersection. In this manner, the traffic light cost thus calculated can vary depending on whether the road leading to the intersection has a higher priority over the others. Further, in the fourth and fifth aspects, the roads connected to the intersection are compared with one another in width (or the number of lanes). In this manner, the traffic light cost thus calculated can vary depending on whether the road leading to the intersection has a higher priority over the others. Therefore, in the route search process, it becomes possible to find an optimal route in a manner reflecting any influence caused by a waiting time at intersections, for example.

According to a sixth aspect, in the first aspect, the route selecting data includes a predetermined reference waiting time cost, and a ratio of waiting time on the load leading to an intersection having a traffic light to the reference waiting time, and in the second step, when the target intersection is determined as having the traffic light in the first step, the reference waiting time cost and the waiting time ratio on the road leading to the target intersection are referred to for calculating the traffic light cost relevant to the waiting time due to the traffic light, and based on the calculated traffic light cost, the passage cost is calculated for the target intersection.

In the sixth aspect, the traffic light cost is calculated based on the reference waiting time cost and the ratio of waiting time for every road leading to the intersection. In this manner, the traffic light cost thus calculated can vary depending on the roads leading to the intersection. Therefore, it becomes possible to find an optimal route in a manner accurately reflecting any influence caused by a waiting time at intersections, for example.

According to a seventh aspect, in the sixth aspect, the reference waiting time cost is an averaged value for waiting times at every intersection having a traffic light.

In the seventh aspect, the reference waiting time is taken through actual measurements at intersections. Therefore, the traffic light cost can be calculated with higher accuracy.

According to an eighth aspect, in the sixth aspect, the route selecting data does not necessarily include the waiting time ratio with respect to the reference waiting time cost for every road leading to the intersection having the traffic light, and in the second step, even if the ratio for a road leading to the target intersection is not included, the ratio for other road leading thereto is referred to for calculating the traffic light cost for the target intersection.

Generally, a plurality of roads leading to an intersection having traffic lights is found plural. In the eighth aspect, the route selecting data does not necessarily include the waiting time ratio for every road leading to the intersection, thereby allowing the data amount of the route selecting data reduced. Accordingly, for any application (e.g., automotive application) naturally restricted in capacity of storage, reduction in the data amount is highly advantageous.

According to a ninth aspect, in the first aspect, the road network data represents a road network by a combination of node and link, and several intersections are represented by several nodes and at least one link, the route selecting data includes an intersection flag which indicates whether the link representing the road network is an intra-intersection link or an extra-intersection link, and in the second step, when the target intersection is determined as having the traffic light in the first step, the intersection flag is referred to for calculating the traffic light cost relevant to the waiting time at the target intersection, and based on the calculated traffic light cost, the passage cost is calculated for the target intersection.

In the ninth aspect, intersections in the road network data may be represented by several nodes and at least one link. Further, the link representing the road network is classified, by the intersection flag, into an intra-intersection link and an extra-intersection link. By utilizing the intersection flag, the traffic light cost can be prevented from being calculated for more than once for the intersection represented by several nodes.

According to a tenth aspect, in the ninth aspect, in the second step, the intersection flag is referred to for determining whether a link representing the road leading to the target intersection is the intra-intersection link or the extra-intersection link, and only when the link representing the road leading to the target intersection is determined as being the extra-intersection link, the traffic light cost is calculated for the traffic light at the target intersection.

According to an eleventh aspect, in the ninth aspect, in the second step, the intersection flag is referred to for determining whether a not-searched link connected to a node representing the target intersection is the intra-intersection link or the extra-intersection link, and only when the not-searched link is determined as being the extra-intersection link, the traffic light cost is calculated for the traffic light at the target intersection.

In the tenth or eleventh aspect, the traffic light cost is calculated only when the intersection flag of the link leading to the target intersection is the extra- or intra-intersection link. In this manner, the traffic light cost can be prevented from being calculated more than once for the intersection represented by several nodes.

According to a twelfth aspect, in the ninth aspect, in a case where the route search process is done in a bi-directional manner started from the designated starting point and from the designated destination, in the second step, for the route search started from the designated destination, the intersection flag is referred to for determining whether a not-searched link connected to a node representing the target intersection is the intra-intersection link or the extra-intersection link, and only when the not-searched link is determined as being the extra-intersection link, the traffic light cost is calculated for the traffic light at the target intersection.

According to a thirteenth aspect, in the ninth aspect, in a case where the route search process is done in a bi-directional manner started from the designated starting point and from the designated destination, in the second step, for the route search started from the designated destination, the intersection flag is referred to for determining whether an accessible link to a node representing the target intersection is the intra-intersection link or the extra-intersection link, and only when the accessible link is determined as being the extra-intersection link, the traffic light cost is calculated for the traffic light at the target intersection.

In the twelfth or thirteenth aspect, in the route search made either from the starting point or the destination, the traffic light cost is calculated for the traffic light at the intersection only when the not-searched link is determined as being the intra- or extra-intersection link for the intersection. Accordingly, the traffic light cost is calculated only once for the intersection represented by several nodes. In detail, the traffic light cost can be prevented from not being calculated or calculated for more than once. Further, under such route search method, even if the intersection is represented by several nodes, in the route search from the destination and that from the staring point, the same node is used for calculating the traffic light cost for the intersection. As a result, the passage cost calculated can be accurate.

According to a fourteenth aspect, in the first aspect, the route selecting data includes a linkage table in which a set of intersections each having a traffic light working in a synchronous manner is stored as a linkage, and in the second step, when the target intersection is determined as having the traffic light in the first step, the linkage table is referred to for calculating the traffic light cost relevant to the waiting time due to the traffic light, and based on the calculated traffic light cost, the passage cost is calculated for the target intersection.

Herein, it is assumed that traffic lights on a road are working in a synchronous manner. On such road, once a first traffic light turns on green, vehicles can smoothly pass through several following traffic lights without stopping. If this is the case, it is practically better not to calculate the traffic light cost for every intersection which has been passed. By taking this into consideration, in the fourteenth aspect, the linkage table has sets of nodes working in a synchronous manner recorded as a linkage. Utilizing such linkage table, the traffic light cost is calculated for the intersections in the second step. The traffic light cost thus calculated can more preferably correspond to such synchronization of the traffic lights. Therefore, the route search can be carried out in a correct manner realistic for actual traffic by, for example, calculating the traffic light cost only for an intersection with a first traffic light in a section where traffic lights are synchronously working.

According to a fifteenth aspect, in the fourteenth aspect, in the second step, when the target intersection is determined as having the traffic light in the first step, the linkage table is referred to for comparing a linkage of a previous intersection with a linkage of the target intersection, based on a result of the comparison, the traffic light cost relevant to the waiting time due to the traffic light at the target intersection is calculated, and based on the calculated traffic light cost, the passage cost is calculated for the target intersection.

According to a sixteenth aspect, in the fifteenth aspect, in the second step, when the target intersection is determined as having the traffic light in the first step, the linkage table is referred to for determining whether an intersection one before and the target intersection belong to the same linkage, and based on the calculated traffic light cost, the passage cost is calculated for the target intersection.

According to a seventeenth aspect, in the fifteenth aspect, in the second step, when the target intersection is determined as having the traffic light in the first step, the linkage table is referred to for comparing an intersection two before and the target intersection belong to the same linkage, when the linkage of the intersection two before is different from the linkage of the target intersection, the traffic light cost relevant to the waiting time due to the traffic light at the intersection is calculated, and based on the calculated traffic light cost, the passage cost is calculated for the target intersection.

In the fifteenth to seventeenth aspects, comparison is made between the previous intersection (one or two before) and the target intersection in linkage to see if they are equal. Based on a result obtained thereby, the traffic light cost is calculated. In this manner, the traffic light cost is calculated in a more preferable manner corresponding to the synchronization of traffic lights.

Herein, it is assumed that a vehicle makes a right turn and enters to a linkage having traffic lights synchronously working. In such case, a traffic light at the first intersection appearing after the vehicle's making of the right turn is often on red. By taking this into consideration, in the seventeenth aspect, comparison is made between an intersection two before and a target intersection in linkage to see if they are equal. Based on the comparison thus made, the traffic light cost is calculated. In this manner, the calculated traffic light cost can more preferably corresponds to traffic lights' working on actual roads.

According to an eighteenth aspect, in the fifteenth aspect, in the second step, when the target intersection is determined as having the traffic light in the first step, the linkage table is referred to for determining whether the previous intersection and the target intersection belong to the same linkage, immediately after the previous intersection and the target intersection are determined as belonging to the same linkage for a predetermined number of times in a row, the traffic light cost relevant to the waiting time due to the traffic light at the target intersection is calculated, and based on the calculated traffic light cost, the passage cost is calculated for the target intersection.

According to a nineteenth aspect, in the fifteenth aspect, in the second step, when the target intersection is determined as having the traffic light in the first step, the linkage table is referred to for determining whether the previous intersection and the target intersection belong to the same linkage, immediately after the previous intersection and the target intersection are determined as belonging to the same linkage for a predetermined amount of time, the traffic light cost relevant to the waiting time due to the traffic light at the target intersection is calculated, and based on the calculated traffic light cost, the passage cost is calculated for the target intersection.

In a section where traffic lights are synchronously working, vehicles rarely passes through the section without stopping at intersections. Therefore, the traffic light cost is calculated, in the eighteenth aspect, immediately after the previous intersection and the target intersection are determined as belonging to the same linkage for a predetermined number of times in a row, and in the nineteenth aspect, immediately after the previous intersection and the target intersection are determined as belonging to the same linkage for a predetermined amount of time. In this manner, when a vehicle goes in a section where traffic lights are synchronously working, the traffic light cost is calculated after a certain length of time of driving. Accordingly, the calculated traffic light cost can more preferably corresponds to traffic lights' working on actual roads.

According to a twentieth aspect, in the fourteenth aspect, the linkage table has a set of intersections each having a traffic light working in a synchronous manner recorded as a linkage, and in the second step, when the target intersection is determined as having the traffic light in the first step, a time for passing the target intersection is estimated, the linkage table is referred to for determining the linkage to which the target intersection belongs at the estimated time, the linkage of the target intersection is compared with the linkage of the previous intersection, and based on the result of the comparison, the traffic light cost relevant to the waiting time due to the traffic light at the target intersection is calculated, and based on the calculated traffic light cost, the passage cost is calculated for the target intersection.

In an actual road network, a combination of traffic lights which work synchronously and which may change depending on a time range exists. Therefore, in the twentieth aspect, the linkage table has sets of intersections each having a traffic light working in a synchronous manner are stored. In the second step, such linkage table is referred to for calculating the traffic light cost, thereby rendering the traffic light cost thus calculated more realistically preferable.

A twenty-first aspect of the present invention is directed to a route selection system for selecting an optimal route on a map, comprising: a route selecting data storage for storing road network data representing an intersection and a road, and route selecting data including a traffic light flag which indicates if the intersection has a traffic light or not; an optimal route searcher for carrying out a route search process for selecting an optimal route between a starting point and a destination based on the route selecting data stored in the route selecting data storage; and a traffic light cost calculator which operates when the optimal route searcher is looking for the optimal route, wherein, in the route search process, the optimal route searcher refers to the traffic light flag in the route selecting data stored in the route selecting data storage to determine whether a target intersection has a traffic light, when the optimal route searcher determines that the target intersection has the traffic light, the traffic light cost calculator calculates a traffic light cost relevant to a waiting time due to the traffic light, and based on the traffic light cost calculated by the traffic light cost calculator, the optimal route searcher calculates a passage cost relevant to a time for passing the target intersection.

According to a twenty-second aspect, in the twenty-first aspect, the route selecting data further includes a predetermined reference waiting time cost, and a ratio of waiting time on the roads leading to an intersection having a traffic light to the reference waiting time, and when the optimal route searcher determines that the target intersection has the traffic light, the traffic light cost calculator calculates the traffic light cost relevant to the waiting time due to the traffic light based on the reference waiting time cost and the waiting time ratio at the intersection.

According to a twenty-third aspect, in the twenty-second aspect, the route selecting data includes the waiting time ratio to the reference waiting time cost for some of the roads leading to the intersection having the traffic light. Even if no waiting time ratio is provided for a road leading to the target intersection, the traffic light cost calculator calculates the traffic light cost for the target intersection based on a waiting time ratio provided for another road leading thereto.

According to a twenty-fourth aspect, in the twenty-first aspect, the road network data represents a road network by a combination of node and link, and the intersection appeared therein may be represented by several nodes and at least one link, the route selecting data further includes an intersection flag which indicates whether the link representing the road network is an intra-intersection link or an extra-intersection link, and the traffic light cost calculator refers to the intersection flag to calculate the traffic light cost relevant to the waiting time due to the traffic light at the target intersection.

According to a twenty-fifth aspect, in the twenty-first aspect, the route selecting data further includes a linkage table in which a set of intersections each having a traffic light working in a synchronous manner is recorded as a linkage, and the traffic light cost calculator refers to the linkage table to calculate the traffic light cost relevant to the waiting time due to the traffic light at the target intersection.

According to a twenty-sixth aspect, in the twenty-fifth aspect, the traffic light cost calculator refers to the linkage table, when the optimal route searcher determines that the target intersection has the traffic light, to determine whether an intersection two before and the target intersection belong to the same linkage, and calculates, when the linkage of the intersection two before is different from the linkage of the target intersection, the traffic light cost relevant to the waiting time due to the traffic light at the target intersection.

According to a twenty-seventh aspect, in the twenty-sixth aspect, the linkage table has a set of intersections each having a traffic light working in a synchronous manner stored as a linkage on a time range basis, and the traffic light cost calculator estimates a time to pass the target intersection, and refers to the linkage table having a linkage stored on the time range basis for determining to which linkage the target intersection belongs at the estimated time, and compares the linkage of the previous intersection and the linkage of the target intersection, and based on a result of the comparison, calculates the traffic light cost relevant to the waiting time due to the traffic light at the target intersection.

A twenty-eighth aspect of the present invention is directed to a recording medium on which a program is recorded for realizing, on a computer device, a process for selecting an optimal route on a map, the recording medium previously storing road network data representing an intersection and a road, and route selecting data including a traffic light flag which indicates if the intersection has a traffic light, the program comprising: a first step of determining, during a route search process for selecting an optimal route between a designated starting point and a destination, whether a target intersection has a traffic light by referring to the traffic light flag included in the route selecting data; and a second step of calculating, based on the determination made in the first step, a passage cost for passing the target intersection, wherein based on the passage cost calculated in the second step, the optimal route is selected.

According to a twenty-ninth aspect, in the twenty-eighth aspect, in the second step, when the target intersection is determined as having the traffic light in the first step, a traffic light cost relevant to a waiting time at the traffic light at the target intersection is calculated, and based on the calculated traffic light cost, the passage cost is calculated for the target intersection.

According to a thirtieth aspect, in the twenty-eighth aspect, the route selecting data includes a predetermined reference waiting time cost, and a ratio of waiting time on the roads leading to an intersection having a traffic light to the reference waiting time, and in the second step, when the target intersection is determined as having the traffic light in the first step, the reference waiting time cost and the waiting time ratio on the road leading to the target intersection are referred to for calculating the traffic light cost relevant to the waiting time due to the traffic light, and based on the calculated traffic light cost, the passage cost is calculated for the target intersection.

According to a thirty-first aspect, in the twenty-eighth aspect, the road network data represents a road network by a combination of node and link, and the intersection appeared therein may be represented by several nodes and at least one link, the route selecting data includes an intersection flag which indicates whether the link representing the road network is an intra-intersection link or an extra-intersection link, and in the second step, when the target intersection is determined as having the traffic light in the first step, the intersection flag is referred to for calculating the traffic light cost relevant to the waiting time at the target intersection, and based on the calculated traffic light cost, the passage cost is calculated for the target intersection.

According to a thirty-second aspect, in the twenty-eighth aspect, the route selecting data includes a linkage table in which a set of intersections each having a traffic light working in a synchronous manner is stored as a linkage, and in the second step, when the target intersection is determined as having the traffic light in the first step, the linkage table is referred to for calculating the traffic light cost relevant to the waiting time due to the traffic light, and based on the calculated traffic light cost, the passage cost is calculated for the target intersection.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a route selection system of one embodiment of the present invention;

FIGS. 2A to 2C are diagrams in assistance of explaining how general road network data is exemplarily represented in route selecting data stored in a second storage 4 in FIG. 1;

FIGS. 3A to 3C are diagrams in assistance of explaining how roads having lanes differed in heading direction located a little away from each other are exemplarily represented in route selecting data stored in the second storage 4 in FIG. 1;

FIG. 12 is a drawing in assistance of explaining how to calculate the traffic light cost for a case where a vehicle passes such linkage as shown in FIG. 11A;

DESCRIPTION OF THE PREFERRED EMBODIMENTS

Figures 4A, 4B:
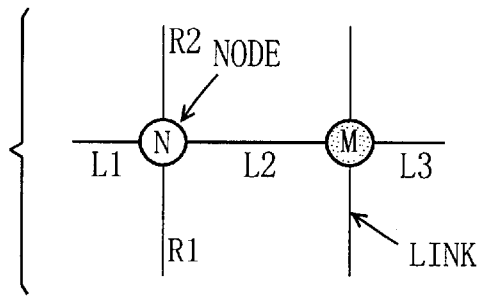
FIGS. 4A and 4B are diagrams in assistance of explaining how to calculate a traffic light cost for a case where a vehicle passes an intersection represented by one node as shown in FIG. 2B.

FIG. 1 is a block diagram showing a route selection system according to one embodiment of the present invention. In FIG. 1, the route selection system is provided with a first storage (first storage unit) 1, locator 2, input device 3, second storage (second storage unit) 4 which corresponds to a route selecting data storage, optimal route searcher 5, traffic light cost calculator 6, third storage (third storage unit) 7, output data generator 8, and output device 9.

The first storage 1 includes a recording medium typified by a CD-ROM, and has location detecting data recorded thereon. Herein, the location detecting data includes a detailed road network used to detect a vehicle's current location.

The locator 2 determines the vehicle's approximate location and trail utilizing the vehicle's speed, turn angle, and/or radio waves from artificial satellites (GPS). The position detector 2 then refers to the first storage 1 for the location detecting data therein to determine the vehicle's precise current location.

The input device 3 operates in response to a user's operation, and outputs the user's destination to the optimal route searcher 5 (if necessary, outputs also the user's starting point, current time, or scheduled times of departure and arrival).

The second storage 4 includes a recording medium typified by a CD-ROM, and has route selecting data recorded thereon.

The optimal route searcher 5 uses the route selecting data provided by the second storage 4 to determine an optimal route between the starting point and destination. The starting point used herein is the vehicle's current location detected by the locator 2 or the starting point inputted by the input device 3. As to the destination, the destination inputted by the input device 3 is used. The optimal route searcher 5 also receives from the input device 3, as required, the current time or the user's scheduled time of departure (arrival). Further, during its search for optimal route, the optimal route searcher 5 brings the signal cost calculator 6 to calculate a traffic light cost, which is used to calculate a passage cost at intersections. Details of the passage cost and the traffic light cost are left for later description.

The traffic light cost calculator 6 calculates the traffic light cost while the optimal route searcher 5 is searching for the optimal route, and outputs the calculated cost back to the optimal route searcher 5. This calculation is done based on information (e.g., presence or absence of traffic light) provided by the optimal route searcher 5, if required.

The third storage 7 includes a recording medium typified by a CD-ROM, and has map displaying data recorded thereon. The map displaying data represents shapes of roads, grounds, harbors, rivers, parks, and the like, on a map. The output data generator 8 uses the map displaying data in the third storage 7 to generate image data. Such image data is used to display the vehicle's current location detected by the locator 2, and a map of the area therearound or a map of the user's requested area.

If the optimal route determined by the optimal route searcher 5 is found in the area to be displayed, the output data generator 8 generates image data representing the optimal route. Thereafter, based on the vehicle's current location and determined optimal route, the output data generator 8 generates guidance information in speech and/or text (for example, "Please make a right turn at an intersection 100 m ahead").

The output device 9 is composed of a display and/or a speaker, for example, and externally outputs the image data and the guidance information generated by the output data generator 8 for display to the user. More specifically, the display outputs the image data and the guidance information in text, and the speaker outputs the guidance information in speech.

With reference to FIGS. 2A to 3C, described next is the route selecting data stored in the second storage 4 shown in FIG. 1.

In FIGS. 2A to 2C, the route selecting data includes road network data representing road connection. In the road network data, the road is not accurately depicted as it is (e.g., see FIG. 2A) but is represented as a vector created on basis of a center line of the actual road (see FIG. 2B). This is done to lessen the amount of data. A point where several vectors are crossing indicates an intersection on the road network, and generally referred to as node. Each node is uniquely assigned a node identifier. Herein, a vector with two nodes at ends indicates a road between two intersections, and generally referred to as link. Each link is uniquely assigned a link identifier.

The route selecting data includes a node table as shown in FIG. 2C. In such node table, a traffic light flag is set to every node identifier to indicate presence or absence of traffic light at actual intersections identified by the nodes.

The roads vary in type, including up and down lines differed in heading direction. The up line has one or more lanes in the same heading direction in stream of traffic. The down line has also one or more lanes, however, in the direction opposite to the up line's. In one case, the up and down lines are each divided by median strips placed therebetween as shown in FIG. 3A (median strip is a dotted area). In another case, the up and down lines are located on the right and left hand sides, respectively, with respect to an elevated road, but a little away from each other. Such up and down lines differed in heading direction are individually vectorized to be represented by a link. Here, FIG. 3B shows nodes and links structuring the intersection formed by the two roads crossing each other in FIG. 3A, and thus four vectors represent two sets of up and down lines. As a result, the intersection is represented by several nodes (M1, M2, M3, and M4), and links are classified into intra-intersection link and extra-intersection link. The intra-intersection link is a link located inside of an intersection represented by several nodes, and a link L2 (thick solid line) in FIG. 3B is the intra-intersection link. Similarly, the extra-intersection link is a link located outside of such intersection.

As shown in FIG. 3C, the route selecting data includes the node table and a link table to be prepared for such case that one intersection is represented by several nodes. The node table is already described by referring to FIG. 2C, and is not described again. In the link table, an intersection flag is set to every link identifier to indicate whether the link is intra- or extra-intersection link.

Described next is a method for calculating the passage cost using the route selecting data. In this embodiment, the passage cost is an evaluation value indicating a length of time taken for a vehicle to pass an intersection, and generally is obtained by adding an entrance/exit cost to the traffic light cost. Here, the entrance/exit cost is an evaluation value indicating a length of time from entering to exiting a node in case of going straight or turning right or left at the node. Such entrance/exit cost is well known (see Japanese Patent Laid-Open Publication No. 4-372985 (92-372985)), and thus is not described here.

The traffic light cost is an evaluation value indicating a vehicle's waiting time due to a traffic light, and this is one of the features of the present invention. Thus, with reference to FIGS. 4A to 8D, a method for calculating the traffic light cost is described in detail below.

FIG. 4A is a schematic view partially showing the road network data included in the route selecting data. In FIG. 4A, two nodes N and M each represent an intersection, that is, one intersection represents one node. To the node N, one end of links L1, L2, R1, and R2 are respectively connected, while to the node M, the other end of link L2 and one end of link L3 are at least connected. FIG. 4B shows the node table and link table for the road network data in FIG. 4A. In the node table, the traffic light flag and a waiting time ratio are respectively set to every node identifier. The traffic light flag is the one already described by referring to FIG. 2C. The node table in FIG. 4B shows that the intersection represented by the node N has traffic lights but the node M none. The waiting time ratio is set to every node having traffic light flag set thereto indicates "present".

The waiting time ratio is now described in detail next below. Herein, a traffic light waiting time is the length of time a red light in the heading direction is on. Since the time varies with the traffic lights, an average is taken through actual measurements. In this system, thus taken average is selected as a preferable reference waiting time cost. Here, the reference waiting time cost may be selected in any manner as deemed appropriate to value. The reference waiting time cost is, as shown in FIG. 4B, stored in the second storage 4 as the route selecting data together with the node table and link table. The waiting time ratio is a ratio of a waiting time to a reference waiting time cost for a case where the car enters one node from one link. In FIG. 4B, the waiting time ratio for the node N is 0.7. This indicates that a traffic light cost for a case where a vehicle enters the node N from the link L1 or L2 is 70%, time-wise, of a reference waiting time cost.

In the link table shown in FIG. 4B, the intersection flag is set to every link identifier. The link table is the one described by referring to FIG. 3C. Since the nodes N and M each indicate an intersection, it is known that the intersection flag for the link L2 having those nodes N and M at ends is the extra-intersection link. The rest of the links in the table in FIG. 4B are also extra-intersection links.

In route search under the Dijkstra method, the traffic light cost necessary for calculation of the passage cost of the nodes N and M is calculated as follows.

First, a traffic light cost for a case where a vehicle enters the node N from the link L1 (white arrow in FIG. 5A) and that from the link R1 (black arrow) are calculated by an equation (1) below.

Traffic Light Cost=Reference Waiting Time Cost×Waiting Time Ratio  (1)

As shown in the node table in FIG. 4B, the waiting time ratio for the case that the vehicle enters the node N from the link L1 is 0.7. Assuming that the reference waiting time is S, the traffic light cost is thus expressed as Traffic Light Cost=0.7×S  (2).

Figure 6A:
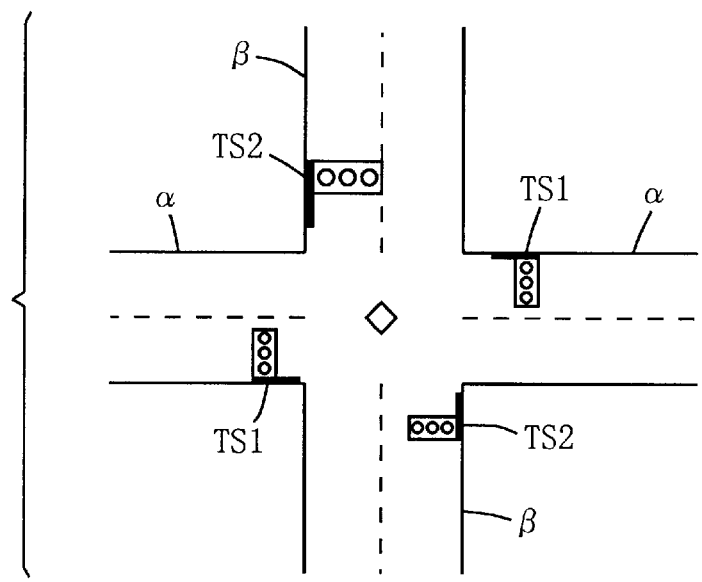
FIGS. 6A to 6C are diagrams in assistance of explaining a method for calculating a waiting time ratio for an entering link, which is not shown in a node table.
Figure 6B:
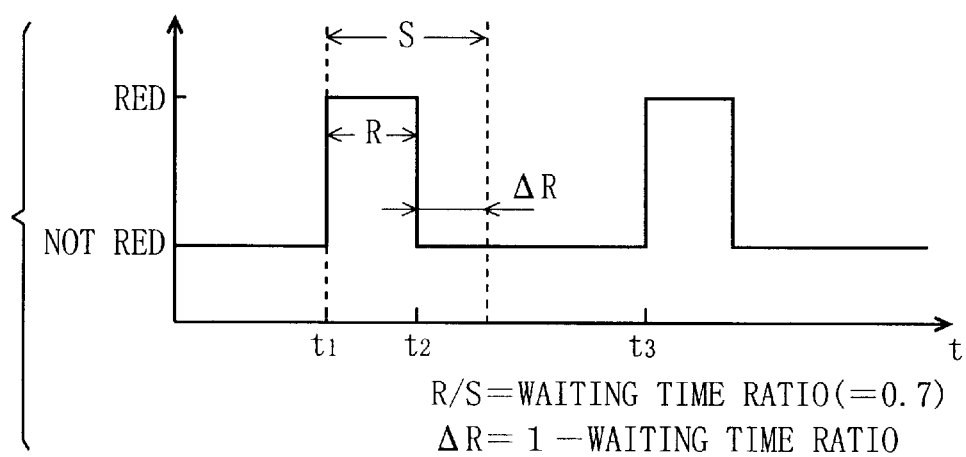
Figure 6C:
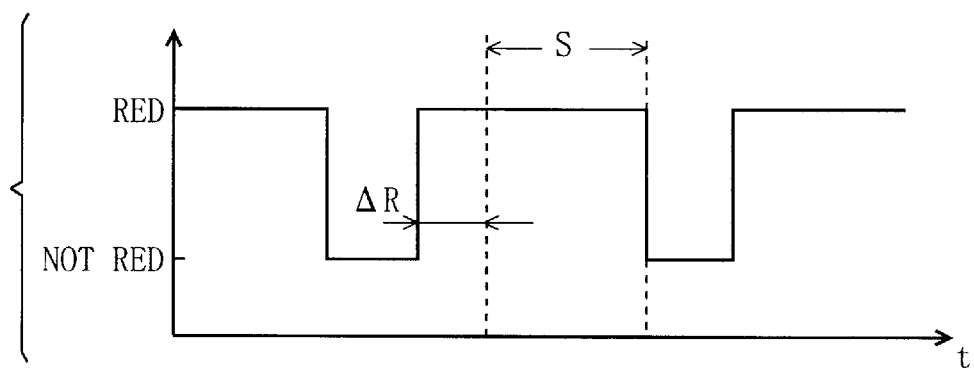

Here, the waiting time ratio for the case that the vehicle enters the node N from the link R1 is 1.3. The reason is described next. As shown in FIG. 6A, an intersection of roads α and β presumably has traffic lights TS1 and TS2. Depicted in FIGS. 6B and 6C is a lighting pattern of the traffic lights TS1 and TS2, respectively. As is known from FIGS. 6A to 6C, when the traffic light TS1 is on red, the traffic light TS2 is not on red, for example green. It is herein assumed that a waiting time ratio at the traffic light TS1 when a vehicle is on the road α is 0.7 with respect to a reference waiting time cost S of 1. Accordingly, the difference in ratio (=1−waiting time ratio at traffic light TS1) is added to a waiting time ratio at the traffic light TS2. Thus, the waiting time ratio at the traffic light TS2 when the vehicle is on the road β is 1+ the difference in ratio (=1−waiting time ratio at traffic light TS1)=1.3. This is the reason why the waiting time ratio for the case that the vehicle enters the node N from the link R1 is 1.3. The traffic light cost for such case can be calculated by an equation (3) below.

$$\text{Traffic Light Cost} = (1+(1-0.7)) \times S = 1.3 \times S \qquad (3)$$

As is known from the above, the waiting time ratio for a case where a vehicle enters the node N from R1 or R2 is calculable if that from L1 or L2 is known, and thus the node table in FIG. 4B has no need to carry such ratio therein. Therefore, in the process of calculating the traffic light cost, the route selection system in FIG. 1 is technically effective in reducing data amount in the second storage 4. Since such route selection system is naturally restricted in size exemplarily in automotive application, the storage 1, 4, and 7 are accordingly restricted in capacity. Therefore, reduction in data amount is highly advantageous.

Figure 5A:
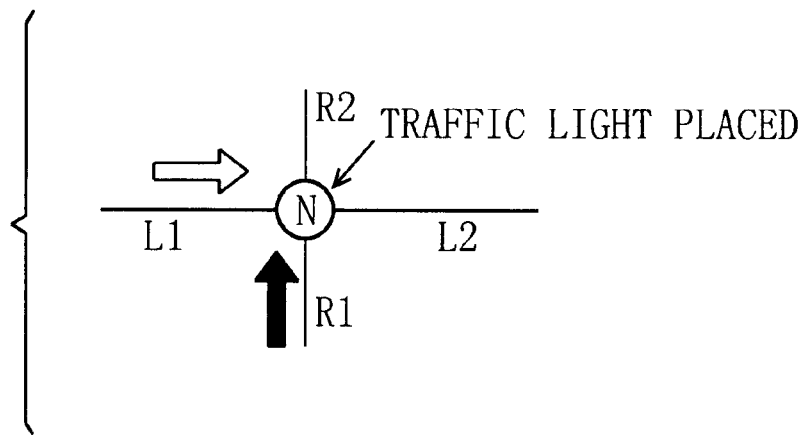
FIGS. 5A and 5B are drawings in assistance of explaining how to calculate the traffic light cost for a case where a vehicle passes an intersection represented by one node as shown in FIG. 2B.
Figure 5B:
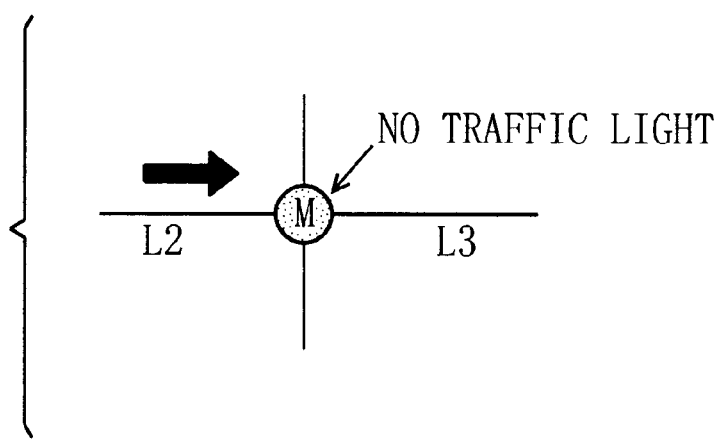

As shown in the black arrow in FIG. 5B, the traffic cost for a case where a vehicle enters the node M from the link L2 is 0. This is because the traffic light flag in the node table in FIG. 4B shows that the node M has no traffic light.

In the method for calculating the traffic light cost described by referring to FIGS. 4A to 6C, one intersection is assumed to be represented by several nodes. Note therein that, the links L1 to L3, and R1 and R2 are all extra-intersection links, and thus no description is made for the intersection flag (details will be later described) used to calculate the traffic light cost.

In the above, the traffic light cost is simply calculated based on the reference waiting time cost and the waiting time ratio. Alternatively, for example, the links (L1, L2, R1, and R2) connected to the node N are researched in type (e.g., highway, street, national road, private road) during route search, and the traffic light cost of a major link may be so calculated as to be lower. In this manner, the traffic light cost can vary depending on the type of link from which a vehicle enters an intersection. Thus, the method for calculating the traffic light cost becomes possible to find an optimal route under careful consideration for influences of the waiting time due to traffic lights and consequences to be caused thereby, for example.

In an alternative manner, the links structuring an intersection are researched in width of the road during route search based on road width information for specifying a road by width, and the traffic light cost of a link wider in width may be so calculated as to be lower.

Or, the links structuring an intersection are researched in the number of lanes of the road during route search based on lane information for specifying a road by the number of lanes, and the traffic light cost of a link having larger number of lanes may be so calculated as to be lower.

Or, the links structuring an intersection are researched in width and the number of lanes during route search, and the traffic light cost of a link the wider in width or having the larger number of lanes may be so calculated as to be lower.

Figures 7A, 7B:
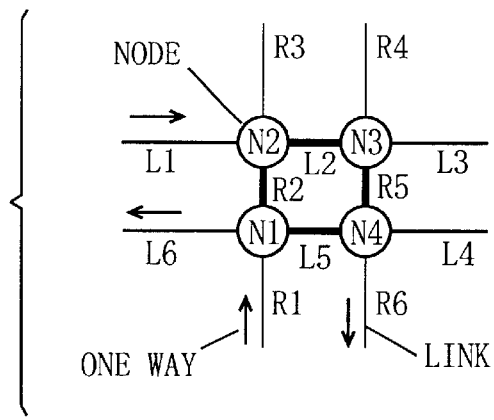
FIGS. 7A and 7B are diagrams in assistance of explaining how to calculate the traffic light cost for a case where a vehicle passes an intersection represented by several nodes as shown in FIG. 3B.

Next, FIGS. 7A to 8D are diagrams in assistance of explaining the method for calculating the traffic light cost in a case where an actual intersection is represented by several nodes. FIG. 7A is a schematic view partially showing the road network data included in the road selecting data. In FIG. 7A, four nodes of N1 to N4 represent one actual intersection. To the node N1, one end of links L5, L6, R1, and R2 are respectively connected. As to the other nodes N2 to N4, see FIG. 7A for detailed connection.

FIG. 7B shows a node table and a link table for the road network data shown in FIG. 7A. In the node table in FIG. 7B, the traffic light flag and the waiting time ratio are set to every node identifier. Since the intersection represented by several nodes has traffic lights, the traffic light flag for each of the nodes N1 to N4 is set to "present". In a case where a vehicle enters the node N1 from the link L5 or L6, the waiting time ratio set to the node N1 is "0.8". Note that, the car cannot enter the node N1 from the link L6 in FIG. 7A. However, since the route search may be made in the bi-directional manner, the waiting time ratio is needed to set to the node N1 in case of entering thereto from the link L6. Similarly, to other nodes N2 to N4, the waiting time ratio is set.

In the link table shown in FIG. 7B, the intersection flag is set to every link identifier (for details, refer to description in the foregoing made as to FIG. 3C). Therein, the intersection flags set to the links L2, L5, R2, and R5 indicate "intra-intersection".

Described next is, in the route search under the Diljkstra method, some tips to calculate the traffic light cost at one intersection represented by several nodes N1 to N4 as shown in FIG. 7A. As already described by referring to FIGS. 4A to 5B, in principle, the traffic light cost is calculated for every node having the traffic light flag set thereto indicates "present". However, this is inappropriate for the case that several nodes represent one intersection. Thus, in route search from a starting point under the Dijkstra method, as a rule, the traffic light cost is calculated only when any link leading to the nodes N1 to N4 (entering link) is the extra-intersection link. Under such rule, the traffic light cost for a case where a vehicle enters from the link L1 into the intersection represented by the nodes N1 to N4 is calculated as follows.

Figure 8A:
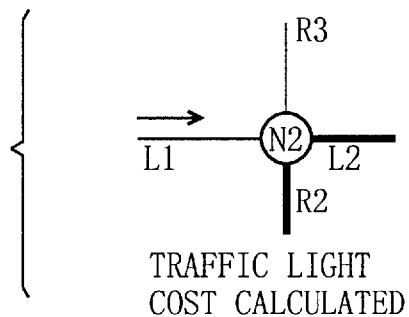
FIGS. 8A to 8D are diagrams in assistance of explaining how to calculate the traffic light cost for a case where a vehicle passes an intersection represented by several nodes as shown in FIG. 3B.
Figure 8B:
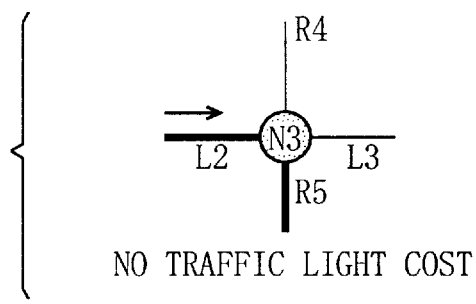
Figure 8C:
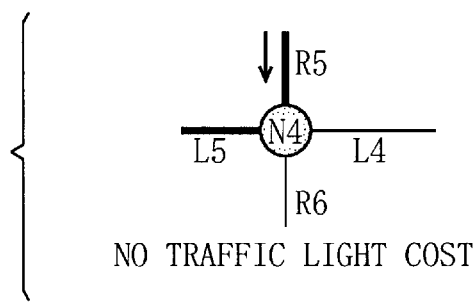
Figure 8D:
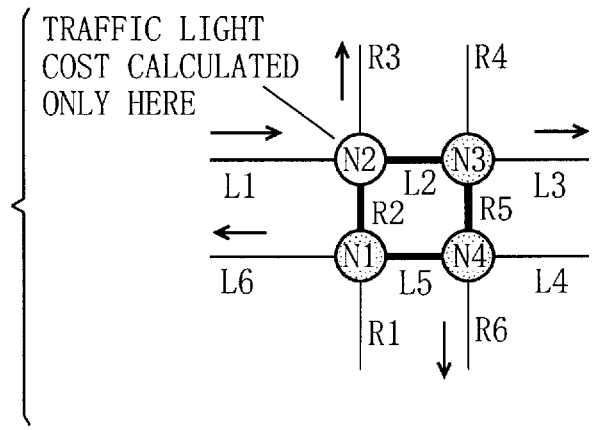

Referring to FIG. 8A, it is assumed that a vehicle approaching the intersection in FIG. 7A or 8D on the link L1 enters the node N2 and then makes a left turn to be on the link R3, or does not make a left-turn on the link L2. In this case, since the entering link, i.e., link L1, is the extra-intersection link (see FIG. 7B), the traffic light cost is calculated for the node N2 by the expression (1). Herein, the reference waiting time cost is S, and the waiting time cost is "0.8" as shown in FIG. 7B. Accordingly, the traffic light cost for the case that the vehicle on the link L1 enters the node N2 and then goes to the link R3 or L2 can be calculated by an expression (5) next below.

$$\text{Traffic Light Cost} = 0.8 \times S \qquad (5)$$

Referring to FIG. 8B, if the vehicle on the link L2 enters the node N3 and then keeps going straight on the link L3 or makes a right turn to be on the link R5, the traffic light cost is not calculated since the entering link, i.e., link L2, is the intra-intersection link (that is, the traffic light cost in such case is 0).

Referring to FIG. 8C, if the vehicle on the link R5 then enters the node N4 and then keeps going straight on the link R6 or makes a right turn to be on the link L5 (vehicle makes a U-turn), the traffic light cost is not calculated as the entering link, i.e., link R5, is the intra-intersection link (that is, the traffic light cost is 0).

As is known from such case with the single intersection represented by several nodes as FIG. 8D, the traffic light cost is calculated only once for the node N2. This is applicable to any other intersection represented by several nodes.

Alternatively, the traffic light cost may be calculated only once when the vehicle exits from such intersection. If this is the case, in the route search from the starting point, the traffic light cost is calculated, as a rule, only when a link from which the vehicle exits the intersection (exiting link) is the extra-intersection link. Under this rule, for the vehicle coming from the link L1, the traffic light cost is calculated for the node N2 with the vehicle's turning left at the intersection, for the node N3 with the vehicle's going straight on the intersection, for the node N4 with the vehicle's turning right thereat, and for the node N1 with the vehicle's making a U-turn thereon.

One of the features of the present invention is that the traffic light cost is calculated only once for the passage cost for one intersection represented by several nodes. To explicate the feature, in route search under the Dijkstra method from a starting point, described in the foregoing are the rules of calculating the traffic light cost only when any link leading to the nodes N1 to N4 is the extra-intersection link, and the rule of calculating the traffic light cost only when any exiting link from those nodes is the extra-intersection link. However, as long as the traffic light cost is calculated only once, any rule will do.

Figure 9:
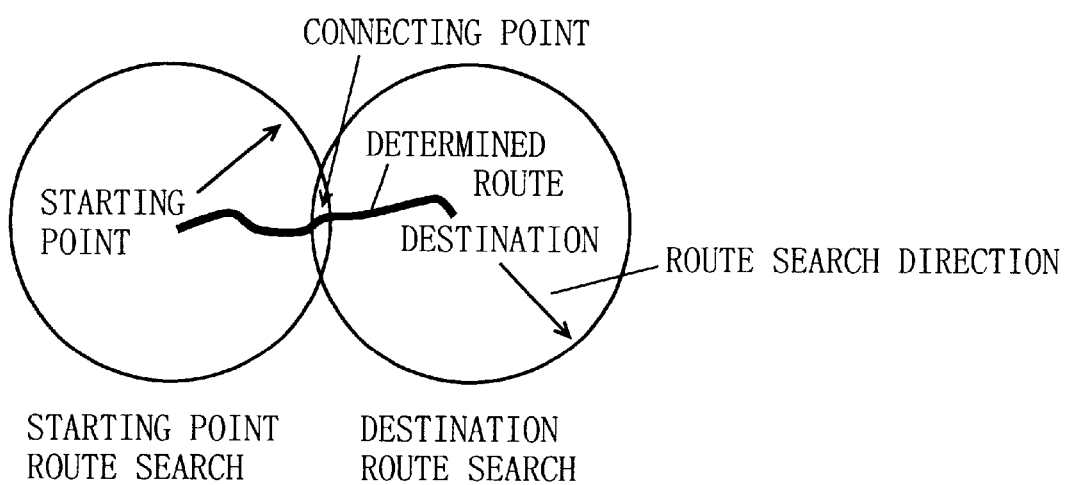
FIG. 9 is a diagram in assistance of explaining a concept of a well-known bi-directional route search.

Described next is how to calculate the traffic light cost in a case where the route search is made in a bi-directional manner. FIG. 9 is a conceptual drawing showing such bi-directional route search. As shown therein, the route search is simultaneously carried out both from a starting point SP (hereinafter, starting point route search) and a destination DP (hereinafter, destination route search), and a route observed in an area where those two encircled areas are connecting is determined as an optimal route. In this manner, the route search is reduced in area about by half, and accordingly in time. Such manner is conventionally known and disclosed in Japanese Patent Laid-Open Publication No. 4-204881 (92-204881).

Here, if the determined optimal route has any intersection represented by several nodes and if the starting point route search and the destination route search are differed in node for calculating the traffic light cost, the traffic light cost may not be calculated or calculated but twice. As a result, in the area where the two encircled areas overlap, a passage cost may not be correctly calculated and thus an optimal route cannot be determined.

Figure 10A:
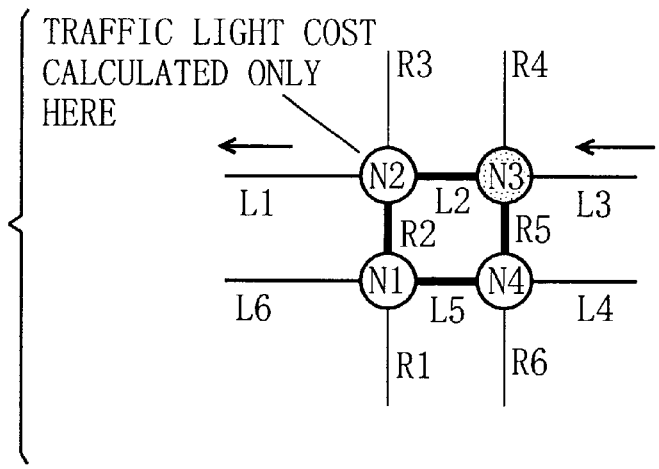
FIGS. 10A to 10C are drawings in assistance of explaining how to determine a node for which the traffic light cost is calculated.
Figure 10B:
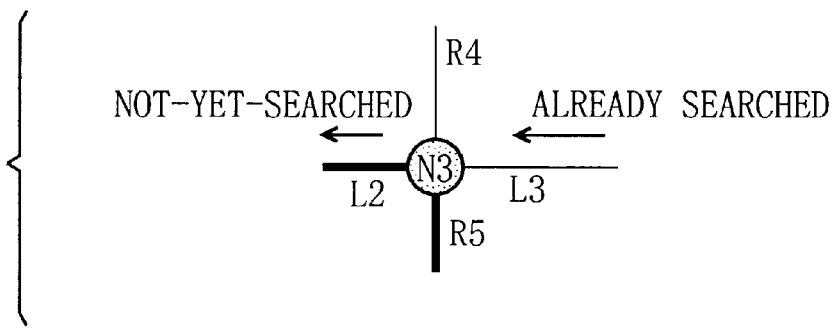
Figure 10C:
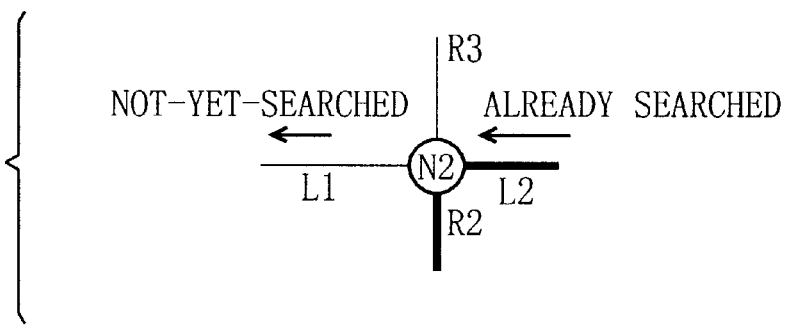

To get around such problem, in the destination route search, described next is a method for calculating the traffic light cost at such intersection as shown FIG. 7A. Reference is made to FIGS. 10A to 10C.

In the starting point route search, when the vehicle enters the intersection of FIG. 7A from the link L1, the traffic light cost is calculated for the node N2 as shown in FIG. 8A. As shown by arrows in FIG. 10A, however, the destination route search is extensively made from a direction opposite to the starting point route search, from an exiting link to an entering link. Therefore, in order to make the destination route search and the staring point route search agree in node for calculating the traffic light cost, exemplarily node N2 in the bi-directional route search from the link L1 to L3, the traffic light cost is calculated only when a link to be searched next is the extra-intersection link (see FIG. 10A).

Next, by referring to FIGS. 10B and 10C, the method for calculating the traffic light cost is described in more detail for the route to be searched from the link L1 to L3 in the destination route search. In such case, the search is first made to the link L3, and then the node N3. It is then determined whether the traffic light cost is calculated or not for such case that the link L3 is the existing link and the link L2 the entering link. Here, the link L3 has been already searched but not yet the link L2, which is the intra-intersection link. By taking this into consideration, the traffic light cost is not calculated for the node N3. Then, in FIG. 10c, when the destination route search reaches the node N2, the link L2 has been already searched but not yet the link L1. In this case, the link L1 is the extra-intersection link, and thus the traffic light cost is calculated. In this manner, the destination route search agrees with the starting point route search in node for calculating the traffic light cost.

In the case that the traffic light cost in the starting point route search is calculated when the vehicle exits from the intersection, the traffic light cost in the destination route search may be calculated only when the already-searched link is the extra-intersection link.

Considered next is a case where several traffic lights are working in a synchronous manner. Specifically, two successive traffic lights are simultaneously turned on green, or at an established interval therebetween. If this is the case, vehicles can smoothly keep going, and thus it is better not to calculate the traffic light cost for every intersection to realize the passage cost with higher correctness. By taking this into consideration, in the present route selection system, the traffic light cost is calculated as next below for such synchronously-working traffic lights.

Figures 11A, 11B:
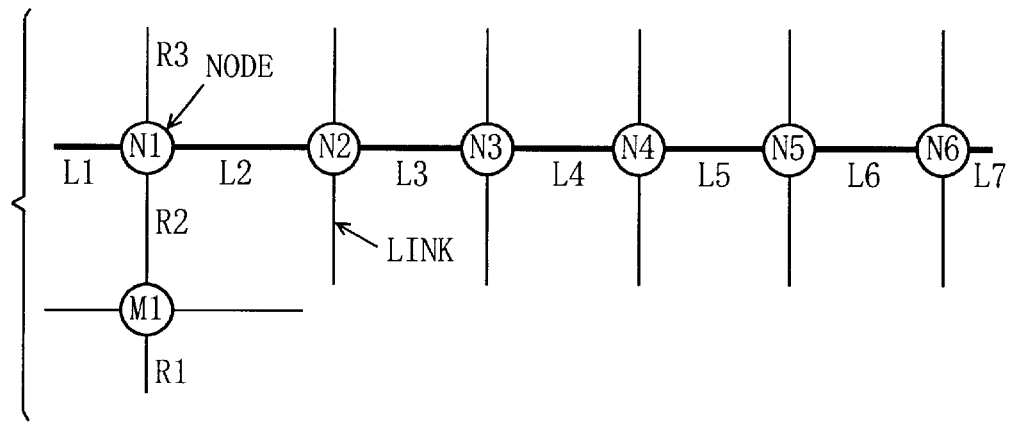
FIGS. 11A and 11B are drawings in assistance of explaining how to determine a node for which the traffic light cost is calculated when a vehicle is on a road network (linkage) having traffic lights synchronously work thereon.

FIG. 11A is a schematic view showing road network data, and traffic lights at nodes shown therein work in a synchronous manner. FIG. 11B shows a node table and a linkage table for the road network data in FIG. 11A.

FIG. 11A shows seven intersections represented by nodes N1 to N6 and M1, respectively. These nodes N1 to N6 and M1 are connected by links as shown. For the sake of clarity, one node represents one intersection in FIG. 11A, and thus links L1 to L7, and links R1 and R2 are all extra-intersection links.

The node table of FIG. 11B is the one already described in the foregoing, and thus is not described again. The node table shows that each of the nodes N1 to N6 and M1 has traffic lights. In the linkage table, time range information and a node identifier are each set to every linkage number. In this embodiment, a linkage means a route on which several synchronously-working traffic lights are placed, and the linkage number is provided to uniquely specify such linkage. The time range information indicates a time range of those traffic lights working in a synchronous manner on the same linkage. A set of node identifiers in the linkage table shows which node belongs to which linkage. From the linkage table carrying such information, it is known, for example, that the linkage #2 includes the nodes N1 to N6, and traffic lights thereon synchronously work from 5:00 to 22:59. As another example, the linkage #1 includes the nodes N1 and M1, and traffic lights thereon synchronously work from midnight to 4:59. As such, the linkage table shows when the traffic lights on the same linkage are synchronously working and which node belongs to which linkage.

Route selecting data used to calculate the traffic light cost for the case that several traffic lights are working in a synchronous manner is composed of the road network data, node table, and linkage table in FIGS. 11A and 11B. In a case where one intersection is represented by several nodes, the link table is included.

Described next is an exemplary procedure for calculating the traffic light cost for a determined route based on the route selecting data in FIGS. 11A and 11B. Assuming that a vehicle is scheduled to pass the road network of FIG. 11A from the link R1 to L7 around noon, the traffic light cost for such case is so calculated as shown in FIG. 12. In the following, the route search is presumably carried out only from a starting point for convenience, and comparison of linkage numbers is made between a target node and a node two before.

In FIG. 12, it is assumed that, before reaching the node M1 which is a target node, the vehicle has passed two nodes both belonging to a linkage #0. In the following, previous linkage is expressed by $[x_1, x_2]$ where $x_1$ indicates the linkage number of the node immediately before the target node M1, and $x_2$ of the node two before. For example, when both of those are 0, the previous linkage is expressed by [0, 0].

From the linkage table in FIG. 11B, it is known that the target node M1 belongs to the linkage #4 around noon. Herein, the target node is the one for which the traffic light cost is determined to be calculated. The linkage number "4" of the target node M1 is different from the linkage number "0" of the node two before, and thus the traffic light cost is calculated for the target node M1.

The vehicle then enters the node N1 from the link R2, and a previous linkage is [4, 0]. Around noon, the node N1 as the target node belongs to the linkage #2. Accordingly, since the linkage number "2" is different from the linkage number "0" of the node two before, the traffic light cost is calculated also for the node N2.

When the vehicle enters the node N3 from the link L3, a previous linkage is [2, 2]. Here, the node N3 belongs to the linkage #2 and a linkage number of a node two before is also 2. As such, when a target node and a node two before are equal in linkage number, it is determined that the traffic cost is not calculated. This is also applicable to the nodes N4, N5, and N6 being the target node, and thus the traffic light cost is not calculated. As such, no waiting time due to traffic lights is considered when a vehicle is driving on a route where traffic lights synchronously work, and thus route search can be carried out in a correct manner realistic for actual traffic.

In the foregoing, a target node and a node two before are compared in linkage number. Alternatively, a target node and a node preceding thereto may be compared in linkage number. In such comparison, however, route search cannot correctly done if a vehicle stops at a traffic light immediately after its right turn to a different linkage. That is, the traffic light cost is not calculated for a target node where the cost is supposed to be calculated.

Alternatively, the traffic light cost calculator 6 may count the number of nodes a vehicle passes on the same linkage, and calculate the traffic light cost every time the counted value reaches a predetermined number (for example, five). In this manner, consideration is given to any feasibility of the vehicle stopping at a traffic light after a certain distance driving on the same linkage. Or, the traffic light cost calculator 6 may calculate the traffic light cost not according to the predetermined number of nodes but a predetermined amount of time driving on the same linkage. Such number of nodes and the amount of driving time may be changed according to a time range of the vehicle's passing.

FIGS. 13 to 18 are flowcharts showing the operation of the route selection system shown in FIG. 1. With reference to FIGS. 13 to 18, described below is how the route selection system in FIG. 1 operates for route selection. In the following, presumably, a route to be searched is the shortest from a vehicle's current location to destination, and the search is made only from a starting point. If any intersection on the route is represented by several nodes, a traffic light cost is to be calculated for the first node. Hereinafter, the shortest route searched between the vehicle's current location and destination is referred to as optimal route.

Figure 13:
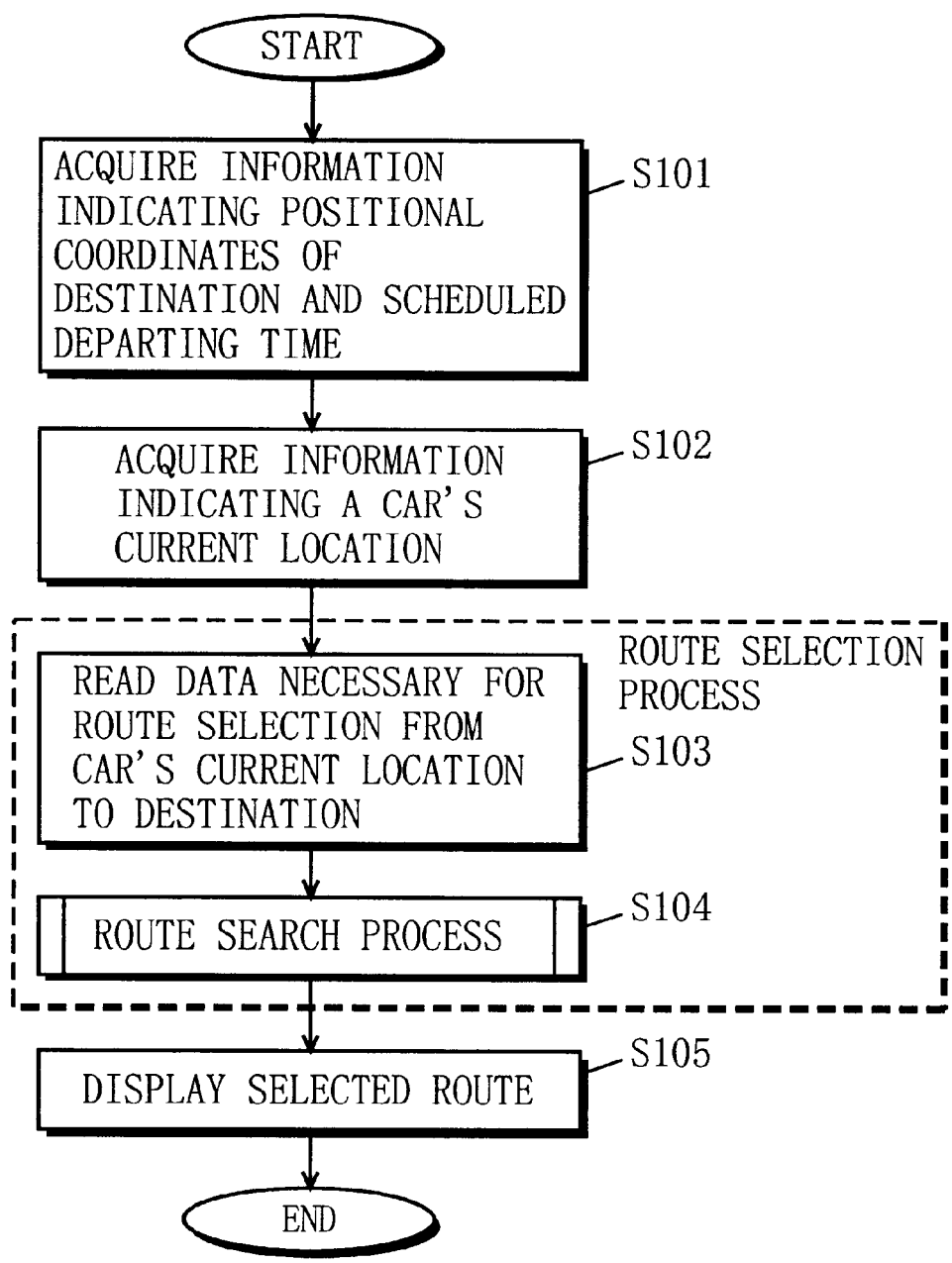
FIG. 13 is a flowchart showing the operation of the route selection system of FIG. 1.

First, in response to the user's operation on the input device 3, the optimal route searcher 5 acquires information which indicates the location of the destination by coordinates (longitude, latitude) (FIG. 13; step S101). Simultaneously, the optimal route searcher 5 also acquires time information indicating the vehicle's time of departure. Next, from the locator 2, the optimal route searcher 5 acquires information which indicates the vehicle's current location by coordinates (longitude, latitude) and information indicating the vehicle's heading direction (step S102). The optimal route searcher 5 then goes through a route selection process to search and select an optimal route on road network data (steps S103 and S104).

In the route selection process above, the optimal route searcher 5 reads the road network data for a region possibly including the optimal route (generally, a region in rectangular including both the starting point and destination) from the second storage 4 for storage in an internal memory, which is not shown (step S103). Since such region is very wide, the road network data read out in step S103 is a combination of plural pieces of data each covers a relatively small region.

Thereafter, based on the coordinates indicating the vehicle's current location and the heading direction, the optimal route searcher 5 refers to the internal memory for the road network data therein to specify the link on which the vehicle is now positioning. By setting the specified link as the starting point for the route search process, the optimal route searcher 5 then searches for the shortest route to the node in the vicinity of the coordinates of the destination (step S104). The route search process in step S104 is carried out under the conventionally-known Dijkstra method, for example. Details of the procedure are shown in the flowcharts of FIGS. 14 and 15.

Figure 14:
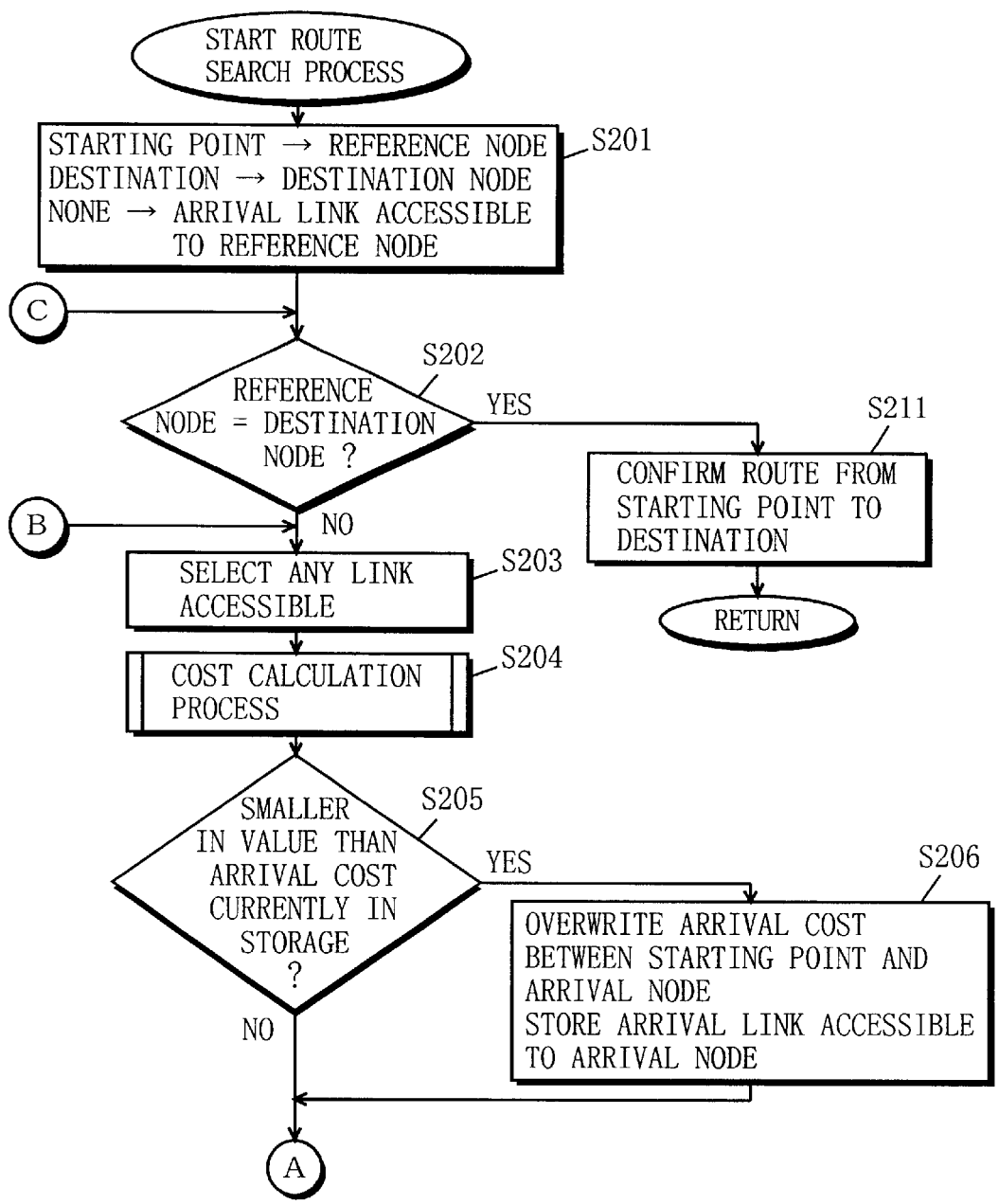
FIG. 14 is a first half of a flowchart showing the detailed operation of a subroutine step S104 in FIG. 13.

Reference is made to FIG. 14. The optimal route searcher 5 goes through initialization (step S201). In detail, the optimal route searcher 5 sets the starting point as a reference node (reference node corresponds to a target intersection in claims), the destination as a destination node, and information indicating that the reference node has no entering link. The optimal route searcher 5 then determines whether or not the reference node is the destination node (step S202). At the beginning of the procedure shown in FIG. 13, the starting point is the reference node, and thus the reference node never be the destination node. Accordingly, the optimal route searcher 5 looks for any accessible link, which means the car can go from the starting point, and if a plurality are found, selects one link (step S203). The optimal route searcher 5 then calculates an arrival cost from the starting point to a node (hereinafter, arrival node) at the end of the link selected in step S203 (step S204). Herein, step S204 is later described in detail.

Thereafter, the optimal route searcher 5 determines whether or not the arrival cost calculated in step S204 is smaller than the minimum arrival cost which is currently stored in the internal memory (Step S205). To be more specific, the route from the starting point to the arrival node is plurally possible. Therefore, the optimal route searcher 5 may have calculated the arrival cost from the starting point to the currently-set arrival node for each different route. From among those arrival costs thus calculated, the minimum arrival cost has already stored in the internal memory (see step S206). In step S205, the arrival cost calculated in step S204 is compared with such stored minimum arrival cost. If it is immediately after the route search process is started, the arrival cost calculated at this time is the first one, and accordingly the determination in step S205 is surely Yes. Thus, the optimal route searcher 5 regards the arrival cost calculated in step S204 as the currently minimum value, and overwrites the minimum arrival cost in the internal memory. The optimal route searcher 5 also stores a link (arrival link) from the starting point to the arrival node into the internal memory (step S206).

Figure 15:
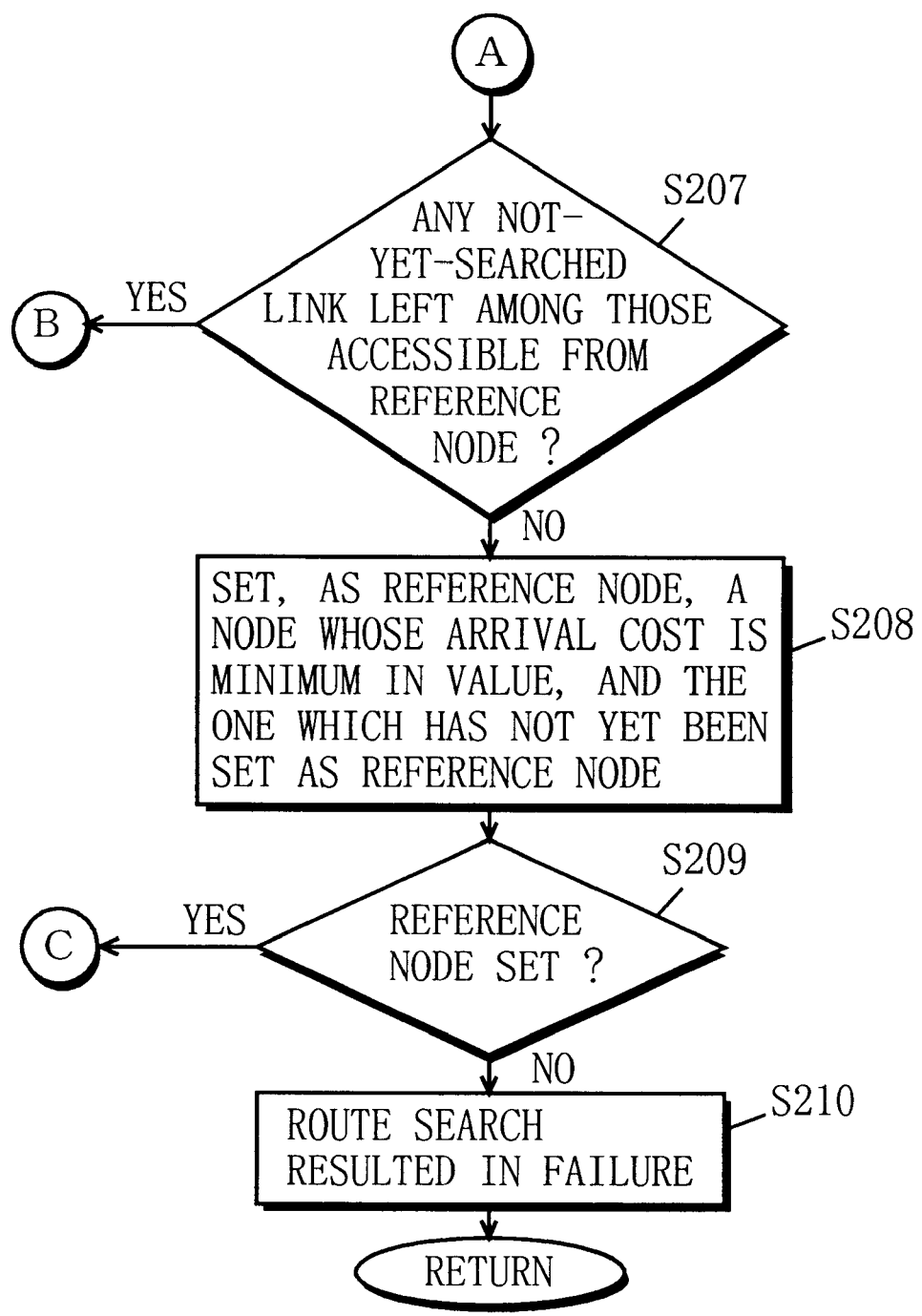
FIG. 15 is a second half of the flowchart showing the detailed operation of the subroutine step S104 in FIG. 13.

The optimal route searcher 5 then determines whether there is any link left not yet selected in step S203 among those accessible from the reference node (currently starting point) (FIG. 15; step S207). If any, the procedure returns to step S203. That is, the optimal route searcher 5 selects any one of those links, calculates the arrival cost from the starting point to the node at the end of the currently-selected link, and stores the minimum arrival cost if required (steps S203 to S207).

Steps S204 to S207 are repeated until every link accessible from the stating point is completely selected and the arrival cost for each of those is calculated. After completion of such procedure, determined in step S207 is No. The optimal route searcher 5 then searches for the next reference node for setting (step S208). The reference node is selected from nodes which have already calculated for their own arrival costs. Herein, the reference node should be the one whose arrival cost is minimum in value, and the one which has not yet been set as the reference node. When the route search process has just started, arrival nodes located at the end of links accessible from the starting point are selectable, and accordingly one arrival node having the minimum arrival cost is selected from thereamong as the next reference node. The optimal route searcher 5 then determines whether the reference node has been set in step S208 or not (step S209). If the reference node has not been set for some reasons, the optimal route searcher 5 determines that the route search has resulted in failure (step S210). The procedure then returns to the main routine of FIG. 13. The optimal route searcher 5 then displays on the output device 9 via the output data generator 8 that the route search has failed (step S105), and this is the end of the procedure.

If the reference node has been set in step S209, the procedure returns to step S202, and goes through steps S203 to S209 with respect to the reference node which is newly set. Described next is the detailed operation for a case where an arbitrary node located between a starting point and a destination is set as the reference node.

First, the newly-set reference node is not determined as being the destination node (step S202). Then, any arrival link which means the link that the car can go from the entering link of the newly-set reference node via the reference node is looked for, and if plurally found, one arrival link is selected from thereamong (step S203). Herein, every node in the road network data is set as the reference node when the shortest route from the starting point is determined. The arrival link from the reference node is a link on the shortest route from the starting point to the reference node, and directly connected to the reference node. In other words, the arrival link is an entering link to the reference node. Next, the optimal route searcher 5 calculates an arrival cost for an arrival node located at the end of the arrival link selected in step S203 (step S204). Detailed procedure for the calculation in step S204 is shown in a flowchart of FIG. 16.

Figure 16:
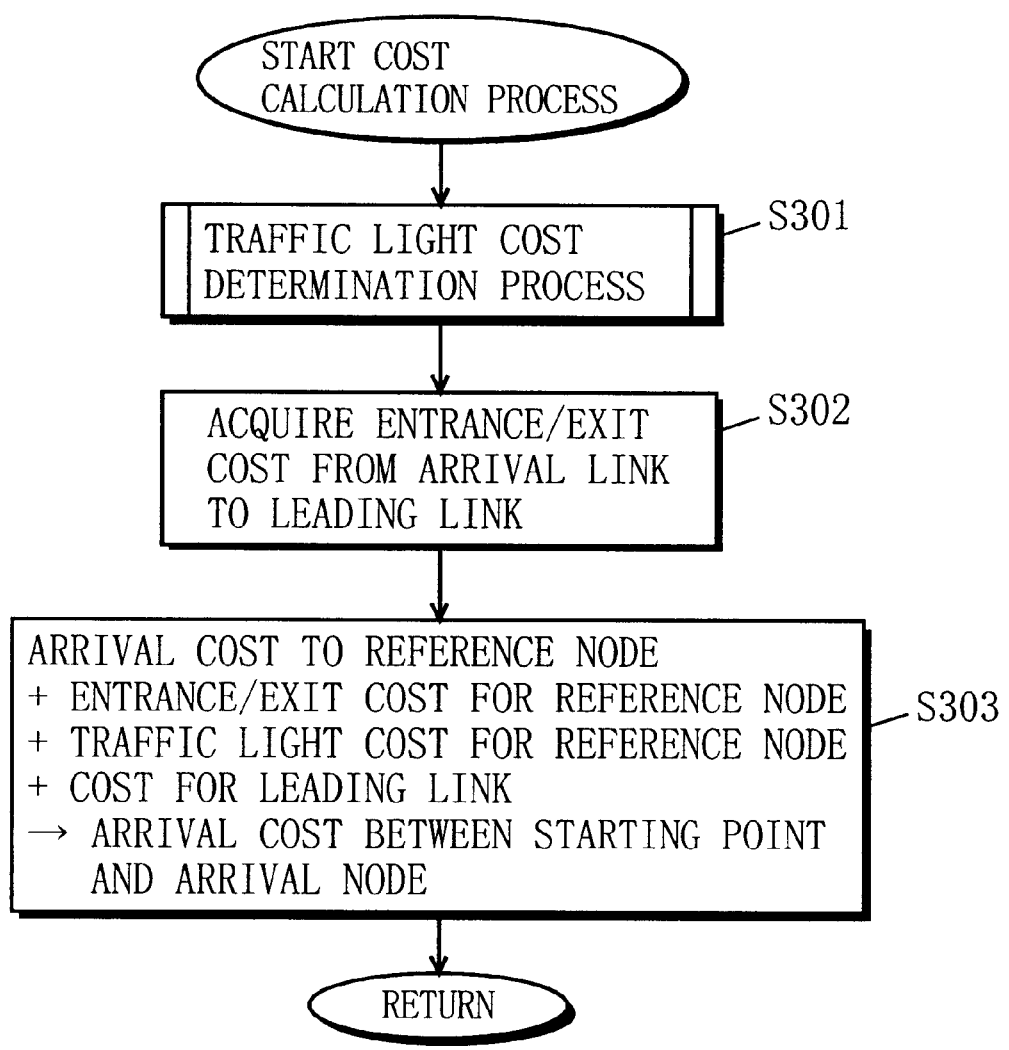
FIG. 16 is a flowchart showing the detailed operation of a subroutine step S204 in FIG. 14.

Reference is now made to FIG. 16. First, the optimal route searcher 5 brings the traffic light cost calculator 6 to determine a traffic light cost (step S301). In step S301, the optimal route searcher 5 fetches any information necessary for the traffic light cost calculator 6 to calculate the traffic light cost from the route selecting data stored in the internal memory, and then provides the fetched information to the traffic light cost calculator 6. Detailed procedure for determining the traffic light cost in step S301 is shown in flowcharts of FIGS. 17 and 18.

Figure 17:
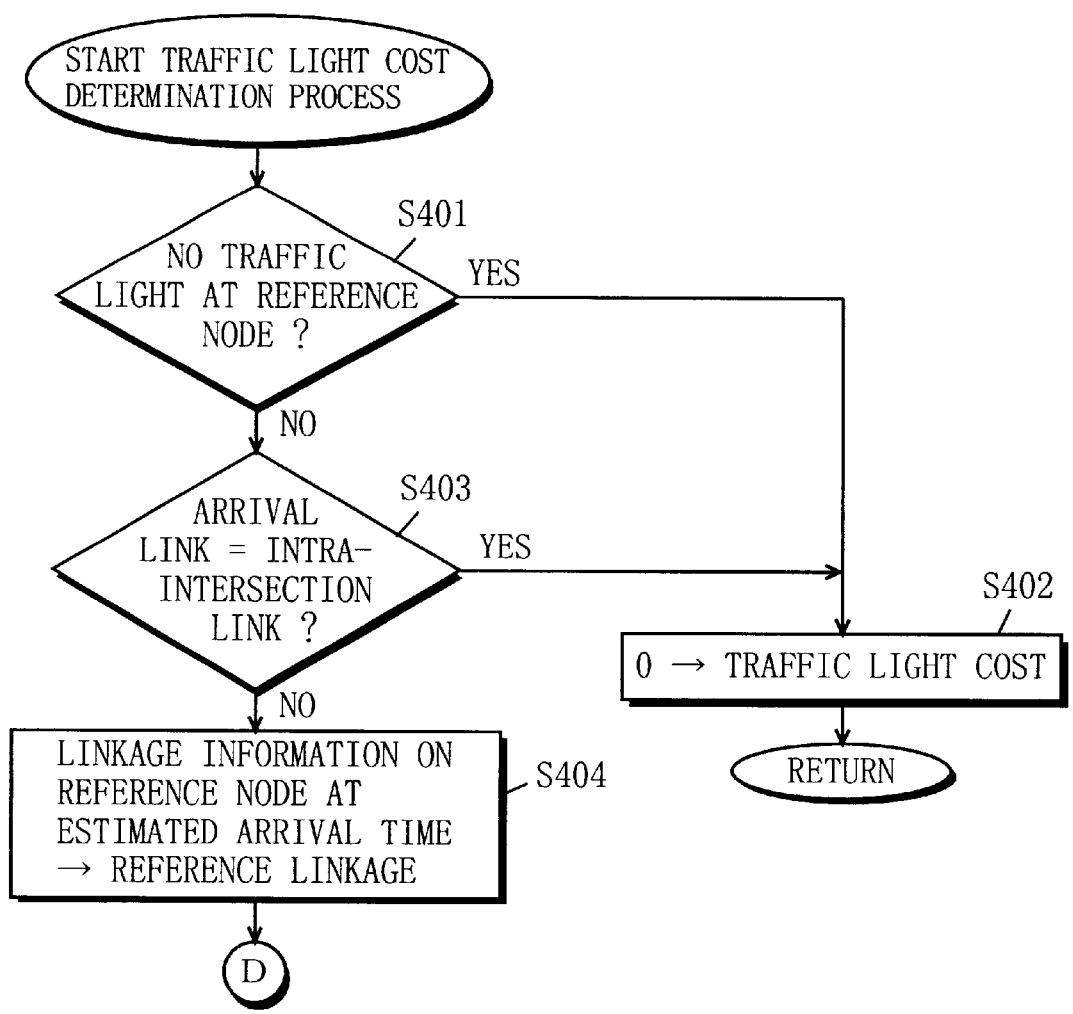
FIG. 17 is a first half of a flowchart showing the detailed operation of a subroutine step S301 in FIG. 16.

In FIG. 17, the traffic light cost calculator 6 first refers to a traffic light flag set to the reference node for determining if the reference node has any traffic light (step S401). If determined that the reference node has no traffic light, the traffic light cost calculator 6 regards the traffic light cost as being 0 (step S402), and the procedure is now through with step S301. If determined that the reference node has traffic lights, on the other hand, the traffic light cost calculator 6 refers to an intersection flag set to an arrival link for determining whether the arrival link is an intra-intersection link or not (step S403). In the case that the arrival link is the intra-intersection link, the traffic light cost is regarded as being 0 in step S402, and this is the end of step S301.

Figure 18:
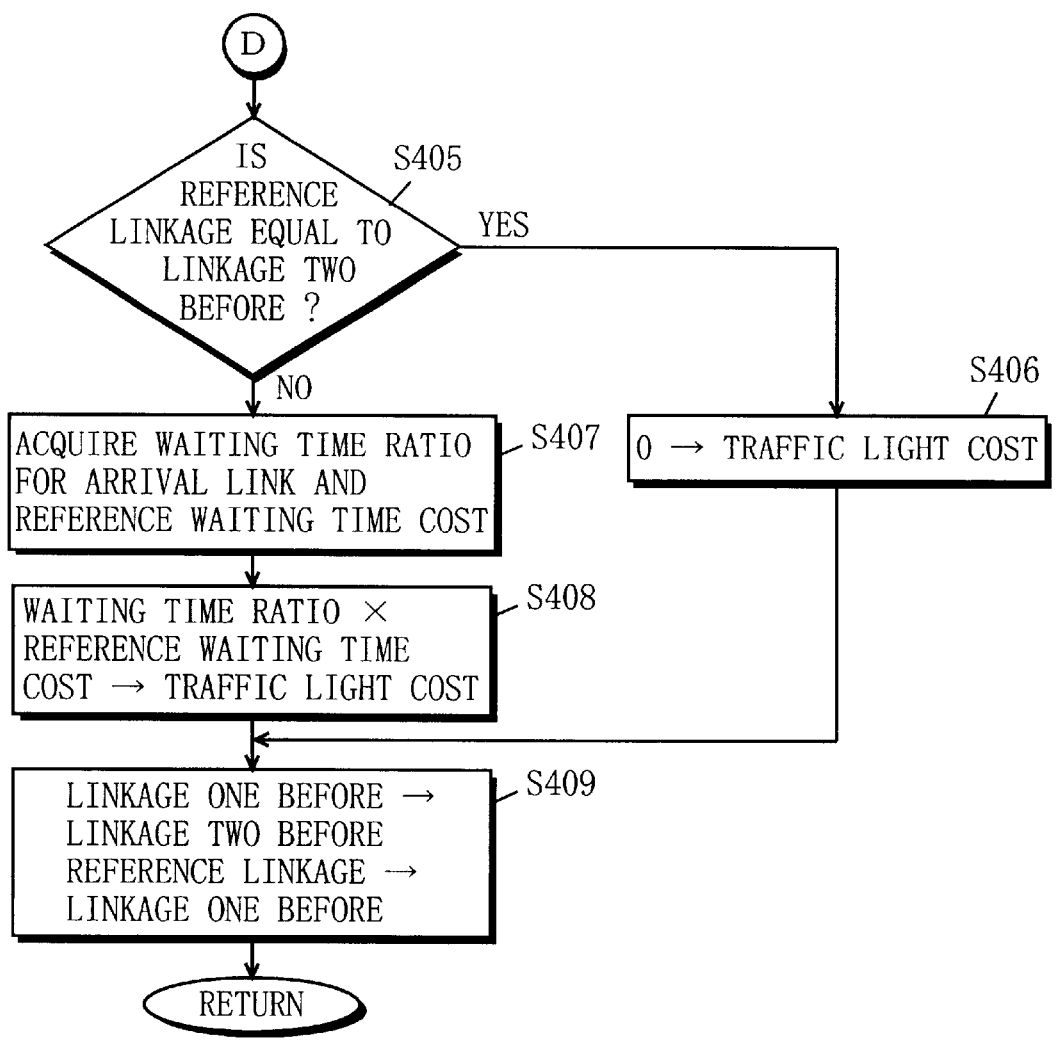
FIG. 18 is a second half of the flowchart showing the detailed operation of the subroutine step S301 in FIG. 16.

In the case that the arrival link is an extra-intersection link in step S403, the traffic light cost calculator 6 refers to a linkage table to see to which linkage the reference node belongs at an estimated time arriving at the reference node. The traffic light cost calculator 6 also regards the linkage found for the reference node as a reference linkage (step S404). Thereafter, the traffic light calculator 6 compares the reference linkage with a linkage two before the reference linkage on the route, and sees whether those two are the same (FIG. 18; step S405). If Yes, the traffic light cost is regarded as being 0 (step S406), and the procedure goes to step S409. If No, the traffic light cost calculator 6 acquires a waiting time ratio for the arrival link from a node table, and a reference waiting time cost from the route selecting data (step S407) (already described with reference to FIGS. 4A to 5B). Based on those acquired waiting time ratio and the reference waiting time cost, the traffic light cost for the reference node is calculated (step S408).

In step S409, the traffic light calculator 6 sets the linkage number of the reference node to a linkage one before, the reference node and a linkage number one before the reference node to a linkage two before the reference node. Then, step S301 is now through with the process for determining the traffic light cost, and the procedure returns to the cost calculation process in FIG. 16.

Reference is now made to FIG. 16 again. After the traffic light cost calculator 6 calculated the traffic light cost in step S301, the optimal route searcher 5 acquires an entrance/exit cost used to evaluate right-turn and left-turn, and straight-ahead driving from the reference node to the entering link (link from the reference node to the arrival node) (step S302). Then, the optimal route searcher 5 adds together the minimum arrival cost from the starting point to the current reference node (which has been already calculated and stored in the internal memory), the entrance/exit cost of the reference node (the one acquired in step S302), the traffic light cost for the reference node (the one acquired in step S301), and a passage cost for the entering link, so that the arrival cost for the arrival node is calculated (step S303). An added value of the entrance/exit cost and the traffic light cost corresponds to a passage cost in claims. Note herein that, features of the present invention lie in a point that the passage cost of the reference node includes the traffic light cost but not the passage cost being the added value of the entrance/exit cost and the traffic light cost. After step S303 is through, the procedure returns to the route selection process in FIG. 14.

Reference is now made back to FIG. 14. The optimal route searcher 5 determines whether or not the arrival cost calculated in step S204 is smaller than the value currently in the internal memory (step S205). If Yes, the optimal route searcher 5 overwrites the value in the internal memory with the arrival cost calculated in step S204. The optimal route searcher 5 also overwrites the arrival link for the arrival node already stored in the internal memory with a link accessible from the reference node to the arrival node (step S206). If the arrival cost calculated in step S204 is not minimum in value, the procedure goes to step S207 shown in FIG. 15 without overwriting the arrival cost and the arrival link.

The optimal route searcher 5 then determines whether there is any link left not yet selected from among those accessible from the reference node (FIG. 15; step S207). If any, steps S203 to S207 are repeated with respect to the link(s) not yet processed. After calculated the arrival cost therefor, another reference node is selected from nodes which have already calculated for their own arrival costs (step S208). Herein, the reference node should be the one whose arrival cost is minimum in value, and the one which has not yet been set as the reference node. The optimal route searcher 5 then determines whether or not the reference node has been set in step S208 (step S209). If Yes, the procedure returns to step S202, and then steps S203 to S209 are repeated with respect to the newly-set reference node.

In the case that the newly-set reference node is a destination node, the procedure goes to step S211 for a route confirmation process. The confirmation process goes back over the links in the internal memory oppositely from the destination side so as to confirm the shortest route from the starting point to the destination. Thereafter, the procedure returns to the main routine in FIG. 13, and the optimal route searcher 5 displays the confirmed shortest route on the output device 9 via the output data generator 8 (step S105). This is the end of the operation of the optimal route searcher 5.

In the foregoing, although the Dijkstra method has been applied in the optimal route searcher 5, other kinds of route search methods will do. Further, although the route search is made based on the nodes in the above, links may be based as disclosed in Japanese Patent Laid-Open Publication No. 4-372985 (92-372985). Still further, the route selecting data is read from the second storage 4 before the route search, the data may be read during the search, or the search may be done without limiting an area for the search in advance.

Still further, the procedure in the above may be realized by a program. By recording such program on a recording medium typified by a CD-ROM and then by distributing the recording medium, the program easily becomes executable on other computer devices. Here, such computer devices include a portable computer, mobile phone, PDA (Personal Digital Assistant), portable navigation device, and the like. Thus, in the above embodiment, the optimal route searcher 5 may search for the shortest route not only for the car but anyone whoever carrying such devices. Also, the recording medium on which the program is recorded, not only the CD-ROM but a magnetic disk, magnetic-optical disk (so-called MO disk), and optical disk will typically do.

While the invention has been described in detail, the foregoing description is in all aspects illustrative and not restrictive. It is understood that numerous other modifications and variations can be devised without departing from the scope of the invention.

What is claimed is:

1. A route selection method for selecting an optimal route on a map, road network data representing an intersection and a road, and route selecting data including a traffic light flag which indicates if the intersection has a traffic light or not are previously stored, the method comprising:

a first step of determining, during a route search process for selecting an optimal route between a designated starting point and a destination, whether a target intersection has a traffic light by referring to the traffic light flag included in the route selecting data; and a second step of calculating, based on the determination made in said first step, a passage cost for passing said target intersection, wherein the passage cost calculated in said second step is used on to select the optimal route.

2. The route selection method according to claim 1, wherein, in said second step, when said target intersection is determined as having the traffic light in said first step, a traffic light cost relevant to a waiting time due to the traffic light is calculated, and based on the calculated traffic light cost, the passage cost is calculated for said target intersection.

3. The route selection method according to claim 1, wherein said route selecting data further includes road type information for specifying a road by type, and in said second step, when said target intersection is determined as having the traffic light in said first step, the road type information for a road connected to the target intersection is referred to for calculating a traffic light cost relevant to a waiting time due to the traffic light, and based on the calculated traffic light cost, the passage cost is calculated for said target intersection.

4. The route selection method according to claim 1, wherein said route selecting data further includes road width information for specifying a road by width, in said second step, when said target intersection is determined as having the traffic light in said first step, the road width information for a road connected to the target intersection is referred to for calculating a traffic light cost relevant to a waiting time due to the traffic light, and based on the calculated traffic light cost, the passage cost is calculated for said target intersection.

5. The route selection method according to claim 1, wherein said route selecting data further includes lane information for specifying a road by a number of lanes, in said second step, when said target intersection is determined as having the traffic light in said first step, the lane information for a road connected to the target intersection is referred to for calculating a traffic light cost relevant to a waiting time due to the traffic light, and based on the calculated traffic light cost, the passage cost is calculated for said target intersection.

6. The route selection method according to claim 1, wherein said route selecting data includes a predetermined reference waiting time cost, and a ratio of waiting time on roads leading to an intersection having a traffic light to the reference waiting time cost, and in said second step, when said target intersection is determined as having the traffic light in said first step, said reference waiting time cost and a waiting time ratio on the roads leading to a target intersection are referred to for calculating the traffic light cost relevant to the waiting time due to the traffic light, and based on the calculated traffic light cost, the passage cost is calculated for said target intersection.

7. The route selection method according to claim 6, wherein said reference waiting time cost is an averaged value for waiting times at every intersection having a traffic light.

8. The route selection method according to claim 6, wherein said route selecting data includes the ratio of waiting time to said reference waiting time cost for some of the roads leading to the intersection having the traffic light, and in said second step,
even if the ratio of waiting time for a road leading to said target intersection is not included, the ratio of waiting time for another road leading thereto is referred to for calculating the traffic light cost for the target intersection.

9. The route selection method according to claim 1, wherein said road network data represents a road network by a combination of node and link, and several intersections are represented by several nodes and at least one link, said route selecting data includes an intersection flag which indicates whether the link representing said road network is an intra-intersection link or an extra-intersection link, and in said second step,
when said target intersection is determined as having the traffic light in said first step, said intersection flag is referred to for calculating a traffic light cost relevant to a waiting time at the target intersection, and
based on the calculated traffic light cost, the passage cost is calculated for said target intersection.

10. The route selection method according to claim 9, wherein, in said second step, said intersection flag is referred to for determining whether a link representing the road leading to said target intersection is the intra-intersection link or the extra-intersection link, and only when the link representing the road leading to said target intersection is determined as being the extra-intersection link, the traffic light cost is calculated for the traffic light at the target intersection.

11. The route selection method according to claim 9, wherein, in said second step, said intersection flag is referred to for determining whether a not-searched link connected to a node representing said target intersection is the intra-intersection link or the extra-intersection link, and only when said not-searched link is determined as being the extra-intersection link, the traffic light cost is calculated for the traffic light at the target intersection.

12. The route selection method according to claim 9, wherein, in a case where said route search process is done in a bi-directional manner, and started from said designated starting point and from said destination, in said second step,
for said route search process started from the destination, said intersection flag is referred to for determining whether a not-searched link connected to a node representing said target intersection is the intra-intersection link or the extra-intersection link, and
only when said not-searched link is determined as being the extra-intersection link, the traffic light cost is calculated for the traffic light at the target intersection.

13. The route selection method according to claim 9, wherein, in a case where said route search process is done in a bi-directional manner started from said designated starting point and from said destination, in said second step,
for said route search process started from the destination, said intersection flag is referred to for determining whether an accessible link to a node representing said target intersection is the intra-intersection link or the extra-intersection link, and
only when said accessible link is determined as being the extra-intersection link, the traffic light cost is calculated for the traffic light at the target intersection.

14. The route selection method according to claim 1, wherein said route selecting data includes a linkage table in which a set of intersections each having a traffic light working in a synchronous manner is stored as a linkage, and in said second step,
when said target intersection is determined as having the traffic light in said first step, said linkage table is referred to for calculating a traffic light cost relevant to a waiting time due to the traffic light, and
based on the calculated traffic light cost, the passage cost is calculated for said target intersection.

15. The route selecting method according to claim 14, wherein, in said second step, when said target intersection is determined as having the traffic light in said first step, said linkage table is referred to for comparing a linkage of a previous intersection with a linkage of said target intersection,
based on a result of the comparison, the traffic light cost relevant to the waiting time due to the traffic light at said target intersection is calculated, and
based on the calculated traffic light cost, the passage cost is calculated for said target intersection.

16. The route selection method according to claim 15, wherein, in said second step, when said target intersection is determined as having the traffic light in said first step, said linkage table is referred to for determining whether an intersection one before the target intersection and the target intersection belong to a same linkage, and
based on the calculated traffic light cost, the passage cost is calculated for said target intersection.

17. The route selection method according to claim 15, wherein, in said second step, when said target intersection is determined as having the traffic light in said first step, said linkage table is referred to for comparing whether an intersection two before the target intersection and the target intersection belong to a same linkage,
when the linkage of said intersection two before the target intersection is different from the linkage of said target intersection, the traffic light cost relevant to the waiting time due to the traffic light at the intersection is calculated, and
based on the calculated traffic light cost, the passage cost is calculated for said target intersection.

18. The route selection method according to claim 15, wherein, in said second step, when said target intersection is determined as having the traffic light in said first step, said linkage table is referred to for determining whether said previous intersection and the target intersection belong to a same linkage,
immediately after said previous intersection and the target intersection are determined as belonging to the same linkage for a predetermined number of times in a row, the traffic light cost relevant to the waiting time due to the traffic light at the target intersection is calculated, and based on the calculated traffic light cost, the passage cost is calculated for said target intersection.

19. The route selection method according to claim 15, wherein, in said second step, when said target intersection is determined as having the traffic light in said first step, said linkage table is referred to for determining whether said previous intersection and said target intersection belong to a same linkage, immediately after said previous intersection and the target intersection are determined as belonging to the same linkage for a predetermined amount of time, the traffic light cost relevant to the waiting time due to the traffic light at the target intersection is calculated, and based on the calculated traffic light cost, the passage cost is calculated for said target intersection.

20. The route selection method according to claim 14, wherein said linkage table has a set of intersections each having a traffic light working in a synchronous manner recorded as a linkage, and in said second step, when said target intersection is determined as having the traffic light in said first step, a time for passing the target intersection is estimated, said linkage table is referred to for determining a linkage to which said target intersection belongs at said estimated time, the linkage of said target intersection is compared with a linkage of a previous intersection, and based on a result of the comparison, the traffic light cost relevant to the waiting time due to the traffic light at the target intersection is calculated, and based on the calculated traffic light cost, the passage cost is calculated for said target intersection.

21. A route selection system for selecting an optimal route on a map, comprising:

a route selecting data storage for storing road network data representing an intersection and a road, and route selecting data including a traffic light flag which indicates if the intersection has a traffic light or not;

an optimal route searcher for carrying out a route search process for selecting an optimal route between a starting point and a destination based on the route selecting data stored in said route selecting data storage; and a traffic light cost calculator which operates when said optimal route searcher is looking for the optimal route, wherein, in said route search process, said optimal route searcher refers to the traffic light flag in the route selecting data stored in said route selecting data storage to determine whether a target intersection has a traffic light, when said optimal route searcher determines that said target intersection has the traffic light, said traffic light cost calculator calculates a traffic light cost relevant to a waiting time due to the traffic light, and based on the traffic light cost calculated by said traffic light cost calculator, said optimal route searcher calculates a passage cost relevant to a time for passing said target intersection.

22. The route selection system according to claim 21, wherein said route selecting data further includes a predetermined reference waiting time cost, and ratio of waiting time on the roads leading to an intersection having a traffic light to the predetermined reference waiting time cost, and when said optimal route searcher determines that said target intersection has the traffic light, said traffic light cost calculator calculates the traffic light cost relevant to the waiting time due to the traffic light based on said reference waiting time cost and the waiting time ratio at the intersection.

23. The route selection system according to claim 22, wherein said route selecting data includes the ratio of waiting time to said reference waiting time cost for some of the roads leading to the intersection having the traffic light, and even if the ratio of waiting time for a road leading to said target intersection is not included, said traffic light cost calculator calculates the traffic light cost for the target intersection based on the ratio of waiting time for another road leading thereto.

24. The route selection system according to claim 21, wherein said road network data represents a road network by a combination of node and link, and several intersections are represented by several nodes and at least one link, said route selecting data further includes an intersection flag which indicates whether the link representing said road network is an intra-intersection link or an extra-intersection link, and said traffic light cost calculator refers to said intersection flag to calculate the traffic light cost relevant to the waiting time due to the traffic light at said target intersection.

25. The route selection system according to claim 21, wherein said route selecting data further includes a linkage table in which a set of intersections each having a traffic light working in a synchronous manner is recorded as a linkage, and said traffic light cost calculator refers to said linkage table to calculate the traffic light cost relevant to the waiting time due to the traffic light at said target intersection.

26. The route selection method according to claim 25, wherein said traffic light cost calculator refers to said linkage table, when said optimal route searcher determines that said target intersection has the traffic light, to determine whether an intersection two before the target intersection and said target intersection belong to a same linkage, and calculates, when the linkage of said intersection two before the target intersection is different from the linkage of said target intersection, the traffic light cost relevant to the waiting time due to the traffic light at the target intersection.

27. The route selection system according to claim 26, wherein said linkage table has a set of intersections each having a traffic light working in a synchronous manner stored as a linkage on a time range basis, and said traffic light cost calculator estimates a time to pass said target intersection, and refers to the linkage table having a linkage stored on the time range basis for determining to which linkage the target intersection belongs at the estimated time, and compares the linkage of said previous intersection and the linkage of said target intersection, and based on a result of the comparison, calculates the traffic light cost relevant to the waiting time due to the traffic light at the target intersection.

28. A recording medium on which a program is recorded for realizing, on a computer device, a process for selecting an optimal route on a map, the recording medium previously storing road network data representing an intersection and a road, and route selecting data including a traffic light flag which indicates if the intersection has a traffic light, the program comprising:

- a first step of determining, during a route search process for selecting an optimal route between a designated starting point and a destination, whether a target intersection has a traffic light by referring to the traffic light flag included in the route selecting data; and
- a second step of calculating, based on the determination made in said first step, a passage cost for passing said target intersection, wherein
- based on the passage cost calculated in said second step, the optimal route is selected.

29. The recording medium according to claim 28, wherein, in said second step,
- when said target intersection is determined as having the traffic light in said first step, a traffic light cost relevant to a waiting time at the traffic light at the target intersection is calculated, and
- based on the calculated traffic light cost, the passage cost is calculated for said target intersection.

30. The recording medium according to claim 28, wherein said route selecting data includes a predetermined reference waiting time cost, and a ratio of waiting time on a road leading to an intersection having a traffic light to the reference waiting time, and
- in said second step,
  - when said target intersection is determined as having the traffic light in said first step, said predetermined reference waiting time cost and the waiting time ratio on the roads leading to the target intersection are referred to for calculating a traffic light cost relevant to a waiting time due to the traffic light, and
  - based on the calculated traffic light cost, the passage cost is calculated for said target intersection.

31. The recording medium according to claim 28, wherein said road network data represents a road network by a combination of node and link, and an intersection appearing therein may be represented by several nodes and at least one link,
- said route selecting data includes an intersection flag which indicates whether the link representing said road network is an intra-intersection link or an extra-intersection link, and
- in said second step,
  - when said target intersection is determined as having the traffic light in said first step, said intersection flag is referred to for calculating a traffic light cost relevant to a waiting time at the target intersection, and
  - based on the calculated traffic light cost, the passage cost is calculated for said target intersection.

32. The recording medium according to claim 28, wherein said route selecting data includes a linkage table in which a set of intersections each having a traffic light working in a synchronous manner is stored as a linkage, and
- in said second step,
  - when said target intersection is determined as having the traffic light in said first step, said linkage table is referred to for calculating a traffic light cost relevant to a waiting time due to the traffic light, and
  - based on the calculated traffic light cost, the passage cost is calculated for said target intersection.

* * * * *